(12) United States Patent
Plante

(10) Patent No.: US 9,566,910 B2
(45) Date of Patent: *Feb. 14, 2017

(54) VEHICLE EVENT RECORDER SYSTEMS AND NETWORKS HAVING INTEGRATED CELLULAR WIRELESS COMMUNICATIONS SYSTEMS

(71) Applicant: SmartDrive Systems, Inc., San Diego, CA (US)

(72) Inventor: James Plante, Del Mar, CA (US)

(73) Assignee: SMARTDRIVE SYSTEMS, INC., San Diego, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/929,197

(22) Filed: Oct. 30, 2015

(65) Prior Publication Data

US 2016/0057342 A1  Feb. 25, 2016

Related U.S. Application Data

(63) Continuation of application No. 11/377,167, filed on Mar. 16, 2006, now Pat. No. 9,201,842.

(51) Int. Cl.
*G06F 19/00* (2011.01)
*G07C 5/08* (2006.01)
(Continued)

(52) U.S. Cl.
CPC .............. *B60R 1/00* (2013.01); *B60R 11/04* (2013.01); *B60R 16/0232* (2013.01);
(Continued)

(58) Field of Classification Search
CPC ... G07C 2209/10; B60R 1/00; B60R 16/0232; B60R 11/04; B60R 2300/8006; B60R 2300/8073; H04L 67/12; H04N 5/23229; H04N 5/23222; H04N 7/183; G06F 17/00; H04W 84/042
See application file for complete search history.

(56) References Cited

U.S. PATENT DOCUMENTS

| 673,203 A | 4/1901 | Freund |
|---|---|---|
| 673,795 A | 5/1901 | Hammer |

(Continued)

FOREIGN PATENT DOCUMENTS

| CA | 2469728 | 12/2005 |
|---|---|---|
| CA | 2469728 A1 | 12/2005 |

(Continued)

OTHER PUBLICATIONS

"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.

(Continued)

*Primary Examiner* — Michael J Zanelli
(74) *Attorney, Agent, or Firm* — Sheppard Mullin Richter & Hampton LLP

(57) ABSTRACT

Vehicle event recorder systems are arranged to be in constant communication with remote servers and administrators via mobile wireless cellular networks. Vehicle event recorders equipped with video cameras capture video and other data records of important events relating to vehicle use. These data are then transmitted over special communications networks having very high coverage space but limited bandwidth. A vehicle may be operated over very large region while maintaining continuous communications connections with a remote fixed server. As such, systems of these inventions may be characterized as including a mobile unit having: a video camera; a microprocessor; memory; an event trigger; and mobile wireless transceivers, and a fixed (Continued)

network portion including: mobile wireless cellular network, a protocol translation gateway, the Internet and an application-specific server.

13 Claims, 5 Drawing Sheets

(51) Int. Cl.

| | | |
|---|---|---|
| *B60R 1/00* | (2006.01) | |
| *G07C 5/00* | (2006.01) | |
| *G06F 17/00* | (2006.01) | |
| *B60R 11/04* | (2006.01) | |
| *B60R 16/023* | (2006.01) | |
| *H04N 5/232* | (2006.01) | |
| *H04N 7/18* | (2006.01) | |
| *H04L 29/08* | (2006.01) | |
| *H04W 84/04* | (2009.01) | |

(52) U.S. Cl.
CPC .............. *G06F 17/00* (2013.01); *G07C 5/008* (2013.01); *G07C 5/085* (2013.01); *G07C 5/0891* (2013.01); *H04L 67/12* (2013.01); *H04N 5/23222* (2013.01); *H04N 5/23229* (2013.01); *H04N 7/183* (2013.01); *B60R 2300/8006* (2013.01); *B60R 2300/8073* (2013.01); *G07C 2209/10* (2013.01); *H04W 84/042* (2013.01)

(56) References Cited

U.S. PATENT DOCUMENTS

| | | |
|---|---|---|
| 673,907 A | 5/1901 | Johnson |
| 676,075 A | 6/1901 | McDougall |
| 679,511 A | 7/1901 | Richards |
| 681,036 A | 8/1901 | Burg |
| 681,283 A | 8/1901 | Waynick |
| 681,998 A | 9/1901 | Swift |
| 683,155 A | 9/1901 | Thompson |
| 683,214 A | 9/1901 | Thompson |
| 684,276 A | 10/1901 | Lonergan |
| 685,082 A | 10/1901 | Wood |
| 685,969 A | 11/1901 | Campbell |
| 686,545 A | 11/1901 | Selph |
| 689,849 A | 12/1901 | Brown |
| 691,982 A | 1/1902 | Sturgis |
| 692,834 A | 2/1902 | Davis |
| 694,781 A | 3/1902 | Prinz |
| 2,943,141 A | 6/1960 | Knight |
| 3,634,866 A | 1/1972 | Meyer |
| 3,781,824 A | 12/1973 | Caiati |
| 3,812,287 A | 5/1974 | Lemelson |
| 3,885,090 A | 5/1975 | Rosenbaum |
| 3,992,656 A | 11/1976 | Joy |
| 4,054,752 A | 10/1977 | Dennis, Jr. |
| 4,072,850 A | 2/1978 | McGlynn |
| 4,258,421 A | 3/1981 | Juhasz |
| 4,271,358 A | 6/1981 | Schwarz |
| 4,276,609 A | 6/1981 | Patel |
| 4,280,151 A | 7/1981 | Tsunekawa |
| 4,281,354 A | 7/1981 | Conte |
| 4,401,976 A | 8/1983 | Stadelmayr |
| 4,409,670 A | 10/1983 | Herndon |
| 4,420,773 A | 12/1983 | Toyoda |
| 4,425,097 A | 1/1984 | Owens |
| 4,456,931 A | 6/1984 | Toyoda |
| 4,489,351 A | 12/1984 | d'Alayer de Costemore d'Arc |
| 4,496,995 A | 1/1985 | Colles |
| 4,500,868 A | 2/1985 | Tokitsu |
| 4,528,547 A | 7/1985 | Rodney |
| 4,533,962 A | 8/1985 | Decker |
| 4,558,379 A | 12/1985 | Hütter et al. |
| 4,588,267 A | 5/1986 | Pastore |
| 4,593,313 A | 6/1986 | Nagasaki |
| 4,621,335 A | 11/1986 | Bluish |
| 4,625,210 A | 11/1986 | Sagl |
| 4,630,110 A | 12/1986 | Cotton |
| 4,632,348 A | 12/1986 | Keesling |
| 4,638,289 A | 1/1987 | Zottnik |
| 4,646,241 A | 2/1987 | Ratchford |
| 4,651,143 A | 3/1987 | Yamanaka |
| 4,671,111 A | 6/1987 | Lemelson |
| 4,718,685 A | 1/1988 | Kawabe |
| 4,754,255 A | 6/1988 | Sanders |
| 4,758,888 A | 7/1988 | Lapidot |
| 4,763,745 A | 8/1988 | Eto |
| 4,785,474 A | 11/1988 | Bernstein |
| 4,789,904 A | 12/1988 | Peterson |
| 4,794,566 A | 12/1988 | Richards |
| 4,804,937 A | 2/1989 | Barbiaux |
| 4,806,931 A | 2/1989 | Nelson |
| 4,807,096 A | 2/1989 | Skogler |
| 4,814,896 A | 3/1989 | Heitzman |
| 4,837,628 A | 6/1989 | Sasaki |
| 4,839,631 A | 6/1989 | Tsuji |
| 4,843,463 A | 6/1989 | Michetti |
| 4,843,578 A | 6/1989 | Wade |
| 4,853,856 A | 8/1989 | Hanway |
| 4,853,859 A | 8/1989 | Morita |
| 4,866,616 A | 9/1989 | Takeuchi |
| 4,876,597 A | 10/1989 | Roy |
| 4,883,349 A | 11/1989 | Mittelhauser |
| 4,896,855 A | 1/1990 | Furnish |
| 4,926,331 A | 5/1990 | Windle |
| 4,930,742 A | 6/1990 | Schofield |
| 4,936,533 A | 6/1990 | Adams |
| 4,939,652 A | 7/1990 | Steiner |
| 4,942,464 A | 7/1990 | Milatz |
| 4,945,244 A | 7/1990 | Castleman |
| 4,949,186 A | 8/1990 | Peterson |
| 4,980,913 A | 12/1990 | Skret |
| 4,987,541 A | 1/1991 | Levente |
| 4,992,943 A | 2/1991 | McCracken |
| 4,993,068 A | 2/1991 | Piosenka |
| 4,995,086 A | 2/1991 | Lilley |
| 5,012,335 A | 4/1991 | Cohodar |
| 5,027,104 A | 6/1991 | Reid |
| 5,046,007 A | 9/1991 | McCrery |
| 5,050,166 A | 9/1991 | Cantoni |
| 5,056,056 A | 10/1991 | Gustin |
| 5,057,820 A | 10/1991 | Markson |
| 5,096,287 A | 3/1992 | Kakinami |
| 5,100,095 A | 3/1992 | Haan |
| 5,111,289 A | 5/1992 | Lucas |
| 5,140,434 A | 8/1992 | VanBlessinger |
| 5,140,436 A | 8/1992 | Blessinger |
| 5,140,438 A | 8/1992 | Kurahashi |
| 5,144,661 A | 9/1992 | Shamosh |
| 5,178,448 A | 1/1993 | Adams |
| 5,185,700 A | 2/1993 | Bezos |
| 5,196,938 A | 3/1993 | Blessinger |
| 5,223,844 A | 6/1993 | Mansell |
| 5,224,211 A | 6/1993 | Roe |
| 5,262,813 A | 11/1993 | Scharton |
| 5,283,433 A | 2/1994 | Tsien |
| 5,294,978 A | 3/1994 | Katayama |
| 5,305,214 A | 4/1994 | Komatsu |
| 5,305,216 A | 4/1994 | Okura |
| 5,308,247 A | 5/1994 | Dyrdek |
| 5,309,485 A | 5/1994 | Chao |
| 5,311,197 A | 5/1994 | Sorden |
| 5,321,753 A | 6/1994 | Gritton |
| 5,327,288 A | 7/1994 | Wellington |
| 5,330,149 A | 7/1994 | Haan |
| 5,333,759 A | 8/1994 | Deering |
| 5,343,527 A | 8/1994 | Moore |
| 5,353,023 A | 10/1994 | Mitsugi |
| 5,361,326 A | 11/1994 | Aparicio, IV |
| 5,387,926 A | 2/1995 | Bellan |
| 5,388,045 A | 2/1995 | Kamiya |
| 5,388,208 A | 2/1995 | Weingartner |
| 5,404,330 A | 4/1995 | Lee |

(56) References Cited

U.S. PATENT DOCUMENTS

| | | |
|---|---|---|
| 5,408,330 A | 4/1995 | Squicciarini |
| 5,422,543 A | 6/1995 | Weinberg |
| 5,430,431 A | 7/1995 | Nelson |
| 5,430,432 A | 7/1995 | Camhi |
| 5,435,184 A | 7/1995 | Pineroli |
| 5,445,024 A | 8/1995 | Riley, Jr. |
| 5,445,027 A | 8/1995 | Zorner |
| 5,446,659 A | 8/1995 | Yamawaki |
| 5,455,625 A | 10/1995 | Englander |
| 5,455,716 A | 10/1995 | Suman |
| 5,465,079 A | 11/1995 | Bouchard |
| 5,473,729 A | 12/1995 | Bryant |
| 5,477,141 A | 12/1995 | Nather |
| 5,495,242 A | 2/1996 | Kick |
| 5,495,243 A | 2/1996 | McKenna |
| 5,497,419 A | 3/1996 | Hill |
| 5,499,182 A | 3/1996 | Ousborne |
| 5,504,482 A | 4/1996 | Schreder |
| 5,513,011 A | 4/1996 | Matsumoto |
| 5,515,285 A | 5/1996 | Garrett, Sr. |
| 5,519,260 A | 5/1996 | Washington |
| 5,521,633 A | 5/1996 | Nakajima |
| 5,523,811 A | 6/1996 | Wada |
| 5,526,269 A | 6/1996 | Ishibashi |
| 5,530,420 A | 6/1996 | Tsuchiya |
| 5,532,678 A | 7/1996 | Kin |
| 5,537,156 A | 7/1996 | Katayama |
| 5,539,454 A | 7/1996 | Williams |
| 5,541,590 A | 7/1996 | Nishio |
| 5,544,060 A | 8/1996 | Fujii |
| 5,546,191 A | 8/1996 | Hibi |
| 5,546,305 A | 8/1996 | Kondo |
| 5,548,273 A | 8/1996 | Nicol |
| 5,552,990 A | 9/1996 | Ihara |
| 5,559,496 A | 9/1996 | Dubats |
| 5,568,211 A | 10/1996 | Bamford |
| 5,570,087 A | 10/1996 | Lemelson |
| 5,570,127 A | 10/1996 | Schmidt |
| 5,574,424 A | 11/1996 | Nguyen |
| 5,574,443 A | 11/1996 | Hsieh |
| D376,571 S | 12/1996 | Kokat |
| 5,581,464 A | 12/1996 | Woll |
| 5,586,130 A | 12/1996 | Doyle |
| 5,590,948 A | 1/1997 | Moreno |
| 5,596,382 A | 1/1997 | Bamford |
| 5,596,647 A | 1/1997 | Wakai |
| 5,600,775 A | 2/1997 | King |
| 5,608,272 A | 3/1997 | Tanguay |
| 5,610,580 A | 3/1997 | Lai |
| 5,612,686 A | 3/1997 | Takano |
| 5,631,638 A | 5/1997 | Kaspar |
| 5,638,273 A | 6/1997 | Coiner |
| 5,642,106 A | 6/1997 | Hancock |
| 5,646,856 A | 7/1997 | Kaesser |
| 5,652,706 A | 7/1997 | Morimoto |
| RE35,590 E | 8/1997 | Bezos |
| 5,654,892 A | 8/1997 | Fujii |
| 5,659,355 A | 8/1997 | Barron |
| 5,666,120 A | 9/1997 | Kline |
| 5,667,176 A | 9/1997 | Zamarripa |
| 5,669,698 A | 9/1997 | Veldman |
| 5,671,451 A | 9/1997 | Takahashi |
| 5,677,979 A | 10/1997 | Squicciarini |
| 5,680,117 A | 10/1997 | Arai |
| 5,680,123 A | 10/1997 | Lee |
| 5,686,765 A | 11/1997 | Washington |
| 5,686,889 A | 11/1997 | Hillis |
| 5,689,442 A | 11/1997 | Swanson |
| 5,696,705 A | 12/1997 | Zykan |
| 5,706,362 A | 1/1998 | Yabe |
| 5,706,909 A | 1/1998 | Bevins |
| 5,712,679 A | 1/1998 | Coles |
| 5,717,456 A | 2/1998 | Rudt |
| 5,719,554 A | 2/1998 | Gagnon |
| 5,758,299 A | 5/1998 | Sandborg |
| 5,781,101 A | 7/1998 | Stephen |
| 5,781,145 A | 7/1998 | Williams |
| 5,784,007 A | 7/1998 | Pepper |
| 5,784,021 A | 7/1998 | Oliva |
| 5,784,521 A | 7/1998 | Nakatani |
| 5,790,403 A | 8/1998 | Nakayama |
| 5,790,973 A | 8/1998 | Blaker |
| 5,793,308 A | 8/1998 | Rosinski |
| 5,793,420 A | 8/1998 | Schmidt |
| 5,793,739 A | 8/1998 | Tanaka |
| 5,793,985 A | 8/1998 | Natarajan |
| 5,794,165 A | 8/1998 | Minowa |
| 5,797,134 A | 8/1998 | McMillan |
| 5,798,458 A | 8/1998 | Monroe |
| 5,800,040 A | 9/1998 | Santo |
| 5,802,545 A | 9/1998 | Coverdill |
| 5,802,727 A | 9/1998 | Blank |
| 5,805,079 A | 9/1998 | Lemelson |
| 5,813,745 A | 9/1998 | Fant, Jr. |
| 5,815,071 A | 9/1998 | Doyle |
| 5,815,093 A | 9/1998 | Kikinis |
| 5,819,198 A | 10/1998 | Peretz |
| 5,825,284 A | 10/1998 | Dunwoody |
| 5,825,412 A | 10/1998 | Hobson |
| 5,844,505 A | 12/1998 | VanRyzin |
| 5,845,733 A | 12/1998 | Wolfsen |
| 5,867,802 A | 2/1999 | Borza |
| 5,877,897 A | 3/1999 | Schofield |
| 5,896,167 A | 4/1999 | Omae |
| 5,897,602 A | 4/1999 | Mizuta |
| 5,897,606 A | 4/1999 | Miura |
| 5,899,956 A | 5/1999 | Chan |
| 5,901,806 A | 5/1999 | Takahashi |
| 5,914,748 A | 6/1999 | Parulski |
| 5,919,239 A | 7/1999 | Fraker |
| 5,926,210 A | 7/1999 | Hackett |
| 5,928,291 A | 7/1999 | Jenkins |
| 5,938,321 A | 8/1999 | Bos |
| 5,946,404 A | 8/1999 | Bakshi |
| 5,948,038 A | 9/1999 | Daly |
| 5,959,367 A | 9/1999 | OFarrell |
| 5,978,017 A | 11/1999 | Tino |
| 6,002,326 A | 12/1999 | Turner |
| 6,006,148 A | 12/1999 | Strong |
| 6,008,723 A | 12/1999 | Yassan |
| 6,008,841 A | 12/1999 | Charlson |
| 6,009,370 A | 12/1999 | Minowa |
| 6,011,492 A | 1/2000 | Garesche |
| 6,028,528 A | 2/2000 | Lorenzetti |
| 6,037,860 A | 3/2000 | Zander |
| 6,037,977 A | 3/2000 | Peterson |
| 6,041,410 A | 3/2000 | Hsu |
| 6,049,079 A | 4/2000 | Noordam |
| 6,057,754 A | 5/2000 | Kinoshita |
| 6,060,989 A | 5/2000 | Gehlot |
| 6,064,792 A | 5/2000 | Fox |
| 6,067,488 A | 5/2000 | Tano |
| 6,076,026 A | 6/2000 | Jambhekar |
| 6,084,870 A | 7/2000 | Wooten |
| 6,088,635 A | 7/2000 | Cox |
| 6,092,008 A | 7/2000 | Bateman |
| 6,092,021 A | 7/2000 | Ehlbeck |
| 6,092,193 A | 7/2000 | Loomis |
| 6,100,811 A | 8/2000 | Hsu |
| 6,111,254 A | 8/2000 | Eden |
| 6,118,768 A | 9/2000 | Bhatia |
| 6,122,738 A | 9/2000 | Millard |
| 6,141,611 A | 10/2000 | Mackey |
| 6,144,296 A | 11/2000 | Ishida |
| 6,147,598 A | 11/2000 | Murphy |
| 6,151,065 A | 11/2000 | Steed |
| 6,163,338 A | 12/2000 | Johnson |
| 6,163,749 A | 12/2000 | McDonough |
| 6,167,186 A | 12/2000 | Kawasaki |
| 6,170,742 B1 | 1/2001 | Yacoob |
| 6,181,373 B1 | 1/2001 | Coles |
| 6,182,010 B1 | 1/2001 | Berstis |
| 6,185,490 B1 | 2/2001 | Ferguson |
| 6,195,605 B1 | 2/2001 | Tabler |

(56) References Cited

U.S. PATENT DOCUMENTS

| | | |
|---|---|---|
| 6,200,139 B1 | 3/2001 | Clapper |
| 6,208,919 B1 | 3/2001 | Barkesseh |
| 6,211,907 B1 | 4/2001 | Scaman |
| 6,218,960 B1 | 4/2001 | Ishikawa |
| 6,246,933 B1 | 6/2001 | Bague |
| 6,246,934 B1 | 6/2001 | Otake |
| 6,252,544 B1 | 6/2001 | Hoffberg |
| 6,253,129 B1 | 6/2001 | Jenkins |
| 6,259,475 B1 | 7/2001 | Ramachandran |
| 6,263,265 B1 | 7/2001 | Fera |
| 6,266,588 B1 | 7/2001 | McClellan |
| 6,298,290 B1 | 10/2001 | Abe |
| 6,300,875 B1 | 10/2001 | Schafer |
| 6,324,450 B1 | 11/2001 | Iwama |
| 6,333,759 B1 | 12/2001 | Mazzilli |
| 6,337,622 B1 | 1/2002 | Sugano |
| 6,349,250 B1 | 2/2002 | Hart |
| 6,353,734 B1 | 3/2002 | Wright |
| 6,356,823 B1 | 3/2002 | Iannotti |
| 6,360,147 B1 | 3/2002 | Lee |
| 6,366,207 B1 | 4/2002 | Murphy |
| 6,389,339 B1 | 5/2002 | Just |
| 6,389,340 B1 | 5/2002 | Rayner |
| 6,400,835 B1 | 6/2002 | Lemelson |
| 6,405,112 B1 | 6/2002 | Rayner |
| 6,405,132 B1 | 6/2002 | Breed |
| 6,408,232 B1 | 6/2002 | Cannon |
| 6,411,874 B2 | 6/2002 | Morgan |
| 6,421,080 B1 | 7/2002 | Lambert |
| 6,434,510 B1 | 8/2002 | Callaghan |
| 6,449,540 B1 | 9/2002 | Rayner |
| 6,456,321 B1 | 9/2002 | Ito |
| 6,459,988 B1 | 10/2002 | Fan |
| 6,470,241 B2 | 10/2002 | Yoshikawa |
| 6,472,771 B1 | 10/2002 | Frese |
| 6,490,513 B1 | 12/2002 | Fish |
| 6,493,650 B1 | 12/2002 | Rodgers |
| 6,505,106 B1 | 1/2003 | Lawrence |
| 6,507,838 B1 | 1/2003 | Syeda-Mahmood |
| 6,508,400 B1 | 1/2003 | Ishifuji |
| 6,516,256 B1 | 2/2003 | Hartmann |
| 6,518,881 B2 | 2/2003 | Monroe |
| 6,525,672 B2 | 2/2003 | Chainer |
| 6,529,159 B1 | 3/2003 | Fan |
| 6,535,804 B1 | 3/2003 | Chun |
| 6,552,682 B1 | 4/2003 | Fan |
| 6,556,905 B1 | 4/2003 | Mittelsteadt |
| 6,559,769 B2 | 5/2003 | Anthony |
| 6,574,538 B2 | 6/2003 | Sasaki |
| 6,575,902 B1 | 6/2003 | Burton |
| 6,580,373 B1 | 6/2003 | Ohashi |
| 6,580,983 B2 | 6/2003 | Laguer-Diaz |
| 6,593,848 B1 | 7/2003 | Atkins, III |
| 6,594,576 B2 | 7/2003 | Fan |
| 6,611,740 B2 | 8/2003 | Lowrey |
| 6,611,755 B1 | 8/2003 | Coffee |
| 6,624,611 B2 | 9/2003 | Kirmuss |
| 6,629,029 B1 | 9/2003 | Giles |
| 6,629,030 B2 | 9/2003 | Klausner |
| 6,636,791 B2 | 10/2003 | Okada |
| 6,664,922 B1 | 12/2003 | Fan |
| 6,665,613 B2 | 12/2003 | Duvall |
| 6,679,702 B1 | 1/2004 | Rau |
| 6,684,137 B2 | 1/2004 | Takagi |
| 6,694,483 B1 | 2/2004 | Nagata |
| 6,701,234 B1 | 3/2004 | Vogelsang |
| 6,714,894 B1 | 3/2004 | Tobey |
| 6,718,239 B2 | 4/2004 | Rayner |
| 6,721,640 B2 | 4/2004 | Glenn |
| 6,721,652 B1 | 4/2004 | Sanqunetti |
| 6,728,612 B1 | 4/2004 | Carver |
| 6,732,031 B1 | 5/2004 | Lightner |
| 6,732,032 B1 | 5/2004 | Banet |
| 6,735,503 B2 | 5/2004 | Ames |
| 6,737,954 B2 | 5/2004 | Chainer |
| 6,738,697 B2 | 5/2004 | Breed |
| 6,739,078 B2 | 5/2004 | Morley |
| 6,741,168 B2 | 5/2004 | Webb |
| 6,745,153 B2 | 6/2004 | White |
| 6,747,692 B2 | 6/2004 | Patel |
| 6,748,305 B1 | 6/2004 | Klausner |
| 6,760,757 B1 | 7/2004 | Lundberg |
| 6,762,513 B2 | 7/2004 | Landgraf |
| 6,795,017 B1 | 9/2004 | Puranik |
| 6,795,111 B1 | 9/2004 | Mazzilli |
| 6,795,759 B2 | 9/2004 | Doyle |
| 6,798,743 B1 | 9/2004 | Ma |
| 6,804,590 B2 | 10/2004 | Sato |
| 6,810,362 B2 | 10/2004 | Adachi |
| 6,812,831 B2 | 11/2004 | Ikeda |
| 6,819,989 B2 | 11/2004 | Maeda |
| 6,831,556 B1 | 12/2004 | Boykin |
| 6,832,140 B2 | 12/2004 | Fan |
| 6,832,141 B2 | 12/2004 | Skeen |
| 6,836,712 B2 | 12/2004 | Nishina |
| 6,842,762 B2 | 1/2005 | Raithel |
| 6,847,873 B1 | 1/2005 | Li |
| 6,850,823 B2 | 2/2005 | Eun |
| 6,859,695 B2 | 2/2005 | Klausner |
| 6,859,705 B2 | 2/2005 | Rao |
| 6,862,524 B1 | 3/2005 | Nagda |
| 6,865,457 B1 | 3/2005 | Mittelsteadt |
| 6,867,733 B2 | 3/2005 | Sandhu |
| 6,873,261 B2 | 3/2005 | Anthony |
| 6,882,313 B1 | 4/2005 | Fan |
| 6,882,912 B2 | 4/2005 | DiLodovico |
| 6,894,606 B2 | 5/2005 | Forbes |
| 6,895,248 B1 | 5/2005 | Akyol |
| 6,898,492 B2 | 5/2005 | deLeon |
| 6,898,493 B2 | 5/2005 | Ehrman |
| 6,919,823 B1 | 7/2005 | Lock |
| 6,922,566 B2 | 7/2005 | Puranik |
| 6,928,348 B1 | 8/2005 | Lightner |
| 6,931,309 B2 | 8/2005 | Phelan |
| 6,947,817 B2 | 9/2005 | Diem |
| 6,950,122 B1 | 9/2005 | Mirabile |
| 6,954,223 B2 | 10/2005 | Miyazawa |
| 6,988,034 B1 | 1/2006 | Marlatt |
| 7,003,289 B1 | 2/2006 | Kolls |
| 7,012,632 B2 | 3/2006 | Freeman |
| 7,020,548 B2 | 3/2006 | Saito |
| 7,023,333 B2 | 4/2006 | Blanco |
| 7,039,510 B2 | 5/2006 | Gumpinger |
| 7,076,348 B2 | 7/2006 | Bucher |
| 7,079,927 B1 | 7/2006 | Tano |
| 7,082,359 B2 | 7/2006 | Breed |
| 7,082,382 B1 | 7/2006 | Rose, Jr. |
| 7,088,387 B1 | 8/2006 | Freeman |
| 7,095,782 B1 | 8/2006 | Cohen |
| 7,098,812 B2 | 8/2006 | Hirota |
| 7,100,190 B2 | 8/2006 | Johnson |
| 7,113,853 B2 | 9/2006 | Hecklinger |
| 7,117,075 B1 | 10/2006 | Larschan |
| 7,119,832 B2 | 10/2006 | Blanco |
| 7,138,904 B1 | 11/2006 | Dutu |
| 7,155,321 B2 | 12/2006 | Bromley |
| 7,177,738 B2 | 2/2007 | Diaz |
| 7,209,833 B2 | 4/2007 | Isaji |
| 7,239,252 B2 | 7/2007 | Kato |
| 7,254,482 B2 | 8/2007 | Kawasaki |
| 7,265,663 B2 | 9/2007 | Steele |
| 7,266,507 B2 | 9/2007 | Simon |
| 7,272,179 B2 | 9/2007 | Siemens |
| 7,308,341 B2 | 12/2007 | Schofield |
| 7,317,974 B2 | 1/2008 | Luskin |
| 7,343,306 B1 | 3/2008 | Bates |
| 7,348,895 B2 | 3/2008 | Lagassey |
| 7,349,027 B2 | 3/2008 | Endo |
| 7,370,261 B2 | 5/2008 | Winarski |
| 7,382,933 B2 | 6/2008 | Dorai |
| 7,386,376 B2 | 6/2008 | Basir |
| 7,389,178 B2 | 6/2008 | Raz |
| 7,457,693 B2 | 11/2008 | Olsen |
| 7,471,189 B2 | 12/2008 | Vastad |

(56) References Cited

U.S. PATENT DOCUMENTS

| | | |
|---|---|---|
| 7,471,192 B2 | 12/2008 | Hara |
| 7,536,457 B2 | 5/2009 | Miller |
| 7,548,586 B1 | 6/2009 | Mimar |
| 7,561,054 B2 | 7/2009 | Raz |
| 7,584,033 B2 | 9/2009 | Mittelsteadt |
| 7,623,754 B1 | 11/2009 | McKain |
| 7,659,827 B2 | 2/2010 | Gunderson |
| 7,659,835 B2 | 2/2010 | Jung |
| 7,667,731 B2 | 2/2010 | Kreiner |
| 7,702,442 B2 | 4/2010 | Takenaka |
| 7,725,216 B2 | 5/2010 | Kim |
| 7,768,548 B2 | 8/2010 | Silvernail |
| 7,769,499 B2 | 8/2010 | McQuade |
| 7,783,956 B2 | 8/2010 | Ko |
| 7,804,426 B2 | 9/2010 | Etcheson |
| 7,821,421 B2 | 10/2010 | Tamir |
| 7,853,376 B2 | 12/2010 | Peng |
| 7,868,912 B2 | 1/2011 | Venetianer |
| 7,893,958 B1 | 2/2011 | DAgostino |
| 7,940,250 B2 | 5/2011 | Forstall |
| 7,941,258 B1 | 5/2011 | Mittelsteadt |
| 7,974,748 B2 | 7/2011 | Goerick |
| 8,054,168 B2 | 11/2011 | McCormick |
| 8,068,979 B2 | 11/2011 | Breed |
| 8,090,598 B2 | 1/2012 | Bauer |
| 8,113,844 B2 | 2/2012 | Huang |
| 8,139,820 B2 | 3/2012 | Plante |
| 8,140,265 B2 | 3/2012 | Grush |
| 8,140,358 B1 | 3/2012 | Ling |
| 8,152,198 B2 | 4/2012 | Breed |
| 8,239,092 B2 | 8/2012 | Plante |
| 8,269,617 B2 | 9/2012 | Cook |
| 8,311,858 B2 | 11/2012 | Everett |
| 8,314,708 B2 | 11/2012 | Gunderson |
| 8,321,066 B2 | 11/2012 | Becker |
| 8,373,567 B2 | 2/2013 | Denson |
| 8,417,562 B1 | 4/2013 | Siemens |
| 8,442,690 B2 | 5/2013 | Goldstein |
| 8,471,701 B2 | 6/2013 | Yariv |
| 8,508,353 B2 | 8/2013 | Cook |
| 8,538,696 B1 | 9/2013 | Cassanova |
| 8,538,785 B2 | 9/2013 | Coleman |
| 8,564,426 B2 | 10/2013 | Cook |
| 8,564,446 B2 | 10/2013 | Gunderson |
| 8,571,755 B2 | 10/2013 | Plante |
| 8,577,703 B2 | 11/2013 | McClellan |
| 8,606,492 B1 | 12/2013 | Botnen |
| 8,635,557 B2 | 1/2014 | Geise |
| 8,676,428 B2 | 3/2014 | Richardson |
| 8,744,642 B2 | 6/2014 | Nemat-Nasser |
| 8,775,067 B2 | 7/2014 | Cho |
| 8,781,292 B1 | 7/2014 | Ross |
| 8,803,695 B2 | 8/2014 | Denson |
| 8,805,110 B2 | 8/2014 | Rhoads |
| 8,849,501 B2 | 9/2014 | Cook |
| 8,855,847 B2 | 10/2014 | Uehara |
| 8,868,288 B2 | 10/2014 | Plante |
| 8,880,279 B2 | 11/2014 | Plante |
| 8,892,310 B1 | 11/2014 | Palmer |
| 8,989,959 B2 | 3/2015 | Plante |
| 8,996,234 B1 | 3/2015 | Tamari |
| 8,996,240 B2 | 3/2015 | Plante |
| 9,047,721 B1 | 6/2015 | Botnen |
| 9,183,679 B2 | 11/2015 | Plante |
| 9,201,842 B2 | 12/2015 | Plante |
| 9,208,129 B2 | 12/2015 | Plante |
| 9,226,004 B1 | 12/2015 | Plante |
| 9,240,079 B2 | 1/2016 | Lambert |
| 2001/0005217 A1 | 6/2001 | Hamilton |
| 2001/0005804 A1 | 6/2001 | Rayner |
| 2001/0018628 A1 | 8/2001 | Jenkins |
| 2001/0020204 A1 | 9/2001 | Runyon |
| 2001/0052730 A1 | 12/2001 | Baur |
| 2002/0019689 A1 | 2/2002 | Harrison |
| 2002/0027502 A1 | 3/2002 | Mayor |
| 2002/0029109 A1 | 3/2002 | Wong |
| 2002/0035422 A1 | 3/2002 | Sasaki |
| 2002/0044225 A1 | 4/2002 | Rakib |
| 2002/0059453 A1 | 5/2002 | Eriksson |
| 2002/0061758 A1 | 5/2002 | Zarlengo |
| 2002/0067076 A1 | 6/2002 | Talbot |
| 2002/0087240 A1 | 7/2002 | Raithel |
| 2002/0091473 A1 | 7/2002 | Gardner |
| 2002/0105438 A1 | 8/2002 | Forbes |
| 2002/0107619 A1 | 8/2002 | Klausner |
| 2002/0111725 A1 | 8/2002 | Burge |
| 2002/0111756 A1 | 8/2002 | Modgil |
| 2002/0118206 A1 | 8/2002 | Knittel |
| 2002/0120374 A1 | 8/2002 | Douros |
| 2002/0135679 A1 | 9/2002 | Scaman |
| 2002/0138587 A1 | 9/2002 | Koehler |
| 2002/0163532 A1 | 11/2002 | Thomas |
| 2002/0169529 A1 | 11/2002 | Kim |
| 2002/0169530 A1 | 11/2002 | Laguer-Diaz |
| 2002/0183905 A1 | 12/2002 | Maeda |
| 2003/0016753 A1 | 1/2003 | Kim |
| 2003/0028298 A1 | 2/2003 | Macky |
| 2003/0053433 A1 | 3/2003 | Chun |
| 2003/0055557 A1 | 3/2003 | Dutta |
| 2003/0065805 A1 | 4/2003 | Barnes |
| 2003/0067541 A1 | 4/2003 | Joao |
| 2003/0079041 A1 | 4/2003 | Parrella |
| 2003/0080713 A1 | 5/2003 | Kirmuss |
| 2003/0080878 A1 | 5/2003 | Kirmuss |
| 2003/0081121 A1 | 5/2003 | Kirmuss |
| 2003/0081122 A1 | 5/2003 | Kirmuss |
| 2003/0081127 A1 | 5/2003 | Kirmuss |
| 2003/0081128 A1 | 5/2003 | Kirmuss |
| 2003/0081934 A1 | 5/2003 | Kirmuss |
| 2003/0081935 A1 | 5/2003 | Kirmuss |
| 2003/0095688 A1 | 5/2003 | Kirmuss |
| 2003/0112133 A1 | 6/2003 | Webb |
| 2003/0125854 A1 | 7/2003 | Kawasaki |
| 2003/0144775 A1 | 7/2003 | Klausner |
| 2003/0152145 A1 | 8/2003 | Kawakita |
| 2003/0154009 A1 | 8/2003 | Basir |
| 2003/0158638 A1 | 8/2003 | Yakes |
| 2003/0177187 A1 | 9/2003 | Levine |
| 2003/0187704 A1 | 10/2003 | Hashiguchi |
| 2003/0191568 A1 | 10/2003 | Breed |
| 2003/0195678 A1 | 10/2003 | Betters |
| 2003/0214585 A1 | 11/2003 | Bakewell |
| 2003/0220835 A1 | 11/2003 | Barnes |
| 2003/0222880 A1 | 12/2003 | Waterman |
| 2004/0008255 A1 | 1/2004 | Lewellen |
| 2004/0033058 A1 | 2/2004 | Reich |
| 2004/0039503 A1 | 2/2004 | Doyle |
| 2004/0039504 A1 | 2/2004 | Coffee |
| 2004/0044452 A1 | 3/2004 | Bauer |
| 2004/0044592 A1 | 3/2004 | Ubik |
| 2004/0054444 A1 | 3/2004 | Abeska |
| 2004/0054513 A1 | 3/2004 | Laird |
| 2004/0054689 A1 | 3/2004 | Salmonsen |
| 2004/0064245 A1 | 4/2004 | Knockeart |
| 2004/0070926 A1 | 4/2004 | Boykin |
| 2004/0083041 A1 | 4/2004 | Skeen |
| 2004/0088090 A1 | 5/2004 | Wee |
| 2004/0103008 A1 | 5/2004 | Wahlbin |
| 2004/0103010 A1 | 5/2004 | Wahlbin |
| 2004/0104842 A1 | 6/2004 | Drury |
| 2004/0111189 A1 | 6/2004 | Miyazawa |
| 2004/0135979 A1 | 7/2004 | Hazelton |
| 2004/0138794 A1 | 7/2004 | Saito |
| 2004/0145457 A1 | 7/2004 | Schofield |
| 2004/0153244 A1 | 8/2004 | Kellum |
| 2004/0153362 A1 | 8/2004 | Bauer |
| 2004/0167689 A1 | 8/2004 | Bromley |
| 2004/0179600 A1 | 9/2004 | Wells |
| 2004/0181326 A1 | 9/2004 | Adams |
| 2004/0184548 A1 | 9/2004 | Kerbiriou |
| 2004/0203903 A1 | 10/2004 | Wilson |
| 2004/0209594 A1 | 10/2004 | Naboulsi |
| 2004/0210353 A1 | 10/2004 | Rice |
| 2004/0230345 A1 | 11/2004 | Tzamaloukas |

(56) References Cited

U.S. PATENT DOCUMENTS

| | | |
|---|---|---|
| 2004/0230370 A1 | 11/2004 | Tzamaloukas |
| 2004/0230373 A1 | 11/2004 | Tzamaloukas |
| 2004/0230374 A1 | 11/2004 | Tzamaloukas |
| 2004/0233284 A1 | 11/2004 | Lesesky |
| 2004/0236474 A1 | 11/2004 | Chowdhary |
| 2004/0243285 A1 | 12/2004 | Gounder |
| 2004/0243308 A1 | 12/2004 | Irish |
| 2004/0243668 A1 | 12/2004 | Harjanto |
| 2004/0254689 A1 | 12/2004 | Blazic |
| 2004/0254698 A1 | 12/2004 | Hubbard |
| 2005/0021199 A1 | 1/2005 | Zimmerman |
| 2005/0043869 A1 | 2/2005 | Funkhouser |
| 2005/0060070 A1 | 3/2005 | Kapolka |
| 2005/0060071 A1 | 3/2005 | Winner |
| 2005/0065682 A1 | 3/2005 | Kapadia |
| 2005/0065716 A1 | 3/2005 | Timko |
| 2005/0073585 A1 | 4/2005 | Ettinger |
| 2005/0078423 A1 | 4/2005 | Kim |
| 2005/0088291 A1 | 4/2005 | Blanco |
| 2005/0099498 A1 | 5/2005 | Lao |
| 2005/0100329 A1 | 5/2005 | Lao |
| 2005/0102074 A1 | 5/2005 | Kolls |
| 2005/0125117 A1 | 6/2005 | Breed |
| 2005/0131585 A1 | 6/2005 | Luskin |
| 2005/0131595 A1 | 6/2005 | Luskin |
| 2005/0131597 A1 | 6/2005 | Raz |
| 2005/0136949 A1 | 6/2005 | Barnes |
| 2005/0137757 A1 | 6/2005 | Phelan |
| 2005/0137796 A1 | 6/2005 | Gumpinger |
| 2005/0146458 A1 | 7/2005 | Carmichael |
| 2005/0149238 A1 | 7/2005 | Stefani |
| 2005/0149259 A1 | 7/2005 | Cherveny |
| 2005/0159964 A1 | 7/2005 | Sonnenrein |
| 2005/0166258 A1 | 7/2005 | Vasilevsky |
| 2005/0168258 A1 | 8/2005 | Poskatcheev |
| 2005/0171692 A1 | 8/2005 | Hamblen |
| 2005/0174217 A1 | 8/2005 | Basir |
| 2005/0182538 A1 | 8/2005 | Phelan |
| 2005/0182824 A1 | 8/2005 | Cotte |
| 2005/0185052 A1 | 8/2005 | Raisinghani |
| 2005/0185936 A9 | 8/2005 | Lao |
| 2005/0192749 A1 | 9/2005 | Flann |
| 2005/0197748 A1 | 9/2005 | Holst |
| 2005/0200714 A1 | 9/2005 | Marchese |
| 2005/0203683 A1 | 9/2005 | Olsen |
| 2005/0206741 A1 | 9/2005 | Raber |
| 2005/0209776 A1 | 9/2005 | Ogino |
| 2005/0212920 A1 | 9/2005 | Evans |
| 2005/0216144 A1 | 9/2005 | Baldassa |
| 2005/0228560 A1 | 10/2005 | Doherty |
| 2005/0233805 A1 | 10/2005 | Okajima |
| 2005/0251304 A1 | 11/2005 | Cancellara |
| 2005/0256681 A1 | 11/2005 | Brinton |
| 2005/0258942 A1 | 11/2005 | Manasseh |
| 2005/0264691 A1 | 12/2005 | Endo |
| 2005/0283284 A1 | 12/2005 | Grenier |
| 2006/0001671 A1 | 1/2006 | Kamijo |
| 2006/0007151 A1 | 1/2006 | Ram |
| 2006/0011399 A1 | 1/2006 | Brockway |
| 2006/0015233 A1 | 1/2006 | Olsen |
| 2006/0022842 A1 | 2/2006 | Zoladek |
| 2006/0025897 A1 | 2/2006 | Shostak |
| 2006/0030986 A1 | 2/2006 | Peng |
| 2006/0040239 A1 | 2/2006 | Cummins |
| 2006/0047380 A1 | 3/2006 | Welch |
| 2006/0053038 A1 | 3/2006 | Warren |
| 2006/0055521 A1 | 3/2006 | Blanco |
| 2006/0057543 A1 | 3/2006 | Roald |
| 2006/0058950 A1 | 3/2006 | Kato |
| 2006/0072792 A1 | 4/2006 | Toda |
| 2006/0078853 A1 | 4/2006 | Lanktree |
| 2006/0082438 A1 | 4/2006 | Bazakos |
| 2006/0092043 A1 | 5/2006 | Lagassey |
| 2006/0095175 A1 | 5/2006 | deWaal |
| 2006/0095199 A1 | 5/2006 | Lagassey |
| 2006/0095349 A1 | 5/2006 | Morgan |
| 2006/0103127 A1 | 5/2006 | Lie |
| 2006/0106514 A1 | 5/2006 | Liebl |
| 2006/0111817 A1 | 5/2006 | Phelan |
| 2006/0122749 A1 | 6/2006 | Phelan |
| 2006/0129578 A1 | 6/2006 | Kim |
| 2006/0142913 A1 | 6/2006 | Coffee |
| 2006/0143435 A1 | 6/2006 | Kwon |
| 2006/0147187 A1 | 7/2006 | Takemoto |
| 2006/0161960 A1 | 7/2006 | Benoit |
| 2006/0168271 A1 | 7/2006 | Pabari |
| 2006/0178793 A1 | 8/2006 | Hecklinger |
| 2006/0180647 A1 | 8/2006 | Hansen |
| 2006/0184295 A1 | 8/2006 | Hawkins et al. |
| 2006/0192658 A1 | 8/2006 | Yamamura |
| 2006/0200008 A1 | 9/2006 | Moore-Ede |
| 2006/0200305 A1 | 9/2006 | Sheha |
| 2006/0204059 A1 | 9/2006 | Ido |
| 2006/0209090 A1 | 9/2006 | Kelly |
| 2006/0209840 A1 | 9/2006 | Paatela |
| 2006/0212195 A1 | 9/2006 | Veith |
| 2006/0215884 A1 | 9/2006 | Ota |
| 2006/0226344 A1 | 10/2006 | Werth |
| 2006/0229780 A1 | 10/2006 | Underdahl |
| 2006/0242680 A1 | 10/2006 | Johnson |
| 2006/0247833 A1 | 11/2006 | Malhotra |
| 2006/0253307 A1 | 11/2006 | Warren |
| 2006/0259218 A1 | 11/2006 | Wu |
| 2006/0261931 A1 | 11/2006 | Cheng |
| 2007/0001831 A1 | 1/2007 | Raz |
| 2007/0005404 A1 | 1/2007 | Raz |
| 2007/0027583 A1 | 2/2007 | Tamir |
| 2007/0027726 A1 | 2/2007 | Warren |
| 2007/0035632 A1 | 2/2007 | Silvernail |
| 2007/0043487 A1 | 2/2007 | Krzystofczyk |
| 2007/0100509 A1 | 5/2007 | Piekarz |
| 2007/0120948 A1 | 5/2007 | Fujioka |
| 2007/0124332 A1 | 5/2007 | Ballesty |
| 2007/0127833 A1 | 6/2007 | Singh |
| 2007/0132773 A1 | 6/2007 | Plante |
| 2007/0135979 A1 | 6/2007 | Plante |
| 2007/0135980 A1 | 6/2007 | Plante |
| 2007/0136078 A1 | 6/2007 | Plante |
| 2007/0142986 A1 | 6/2007 | Alaous |
| 2007/0143499 A1 | 6/2007 | Chang |
| 2007/0150138 A1 | 6/2007 | Plante |
| 2007/0150140 A1 | 6/2007 | Seymour |
| 2007/0173994 A1 | 7/2007 | Kubo |
| 2007/0179691 A1 | 8/2007 | Grenn |
| 2007/0183635 A1 | 8/2007 | Weidhaas |
| 2007/0208494 A1 | 9/2007 | Chapman |
| 2007/0216521 A1 | 9/2007 | Guensler |
| 2007/0219685 A1 | 9/2007 | Plante |
| 2007/0219686 A1 | 9/2007 | Plante |
| 2007/0236474 A1 | 10/2007 | Ramstein |
| 2007/0241874 A1 | 10/2007 | Okpysh |
| 2007/0244614 A1 | 10/2007 | Nathanson |
| 2007/0253307 A1 | 11/2007 | Mashimo |
| 2007/0257781 A1 | 11/2007 | Denson |
| 2007/0257782 A1 | 11/2007 | Etcheson |
| 2007/0257804 A1 | 11/2007 | Gunderson |
| 2007/0257815 A1 | 11/2007 | Gunderson |
| 2007/0260677 A1 | 11/2007 | DeMarco |
| 2007/0263984 A1 | 11/2007 | Sterner |
| 2007/0268158 A1 | 11/2007 | Gunderson |
| 2007/0271105 A1 | 11/2007 | Gunderson |
| 2007/0273480 A1 | 11/2007 | Burkman |
| 2007/0279214 A1 | 12/2007 | Buehler |
| 2007/0280677 A1 | 12/2007 | Drake |
| 2007/0299612 A1 | 12/2007 | Kimura |
| 2008/0035108 A1 | 2/2008 | Ancimer |
| 2008/0059019 A1 | 3/2008 | Delia |
| 2008/0071827 A1 | 3/2008 | Hengel |
| 2008/0111666 A1 | 5/2008 | Plante |
| 2008/0122603 A1 | 5/2008 | Plante |
| 2008/0143834 A1 | 6/2008 | Comeau |
| 2008/0147267 A1 | 6/2008 | Plante |
| 2008/0157510 A1 | 7/2008 | Breed |
| 2008/0167775 A1 | 7/2008 | Kuttenberger |

(56) References Cited

U.S. PATENT DOCUMENTS

| | | |
|---|---|---|
| 2008/0169914 A1 | 7/2008 | Albertson |
| 2008/0177436 A1 | 7/2008 | Fortson |
| 2008/0195261 A1 | 8/2008 | Breed |
| 2008/0204556 A1 | 8/2008 | de Miranda |
| 2008/0211779 A1 | 9/2008 | Pryor |
| 2008/0234920 A1 | 9/2008 | Nurminen |
| 2008/0243389 A1 | 10/2008 | Inoue |
| 2008/0252412 A1 | 10/2008 | Larsson |
| 2008/0252485 A1 | 10/2008 | Lagassey |
| 2008/0252487 A1 | 10/2008 | McClellan |
| 2008/0269978 A1 | 10/2008 | Shirole |
| 2008/0281485 A1 | 11/2008 | Plante |
| 2008/0309762 A1 | 12/2008 | Howard |
| 2008/0319604 A1 | 12/2008 | Follmer |
| 2009/0009321 A1 | 1/2009 | McClellan |
| 2009/0043500 A1 | 2/2009 | Satoh |
| 2009/0043971 A1 | 2/2009 | Kim |
| 2009/0051510 A1 | 2/2009 | Follmer |
| 2009/0138191 A1 | 5/2009 | Engelhard |
| 2009/0157255 A1 | 6/2009 | Plante |
| 2009/0216775 A1 | 8/2009 | Ratliff |
| 2009/0224869 A1 | 9/2009 | Baker |
| 2009/0290848 A1 | 11/2009 | Brown |
| 2009/0299622 A1 | 12/2009 | Denaro |
| 2009/0312998 A1 | 12/2009 | Berckmans |
| 2009/0326796 A1 | 12/2009 | Prokhorov |
| 2009/0327856 A1 | 12/2009 | Mouilleseaux |
| 2010/0030423 A1 | 2/2010 | Nathanson |
| 2010/0045451 A1 | 2/2010 | Periwal |
| 2010/0049516 A1 | 2/2010 | Talwar |
| 2010/0054709 A1 | 3/2010 | Misawa |
| 2010/0057342 A1 | 3/2010 | Muramatsu |
| 2010/0063672 A1 | 3/2010 | Anderson |
| 2010/0063680 A1 | 3/2010 | Tolstedt |
| 2010/0063850 A1 | 3/2010 | Daniel |
| 2010/0070175 A1 | 3/2010 | Soulchin |
| 2010/0076621 A1 | 3/2010 | Kubotani |
| 2010/0085193 A1 | 4/2010 | Boss |
| 2010/0085430 A1 | 4/2010 | Kreiner |
| 2010/0087984 A1 | 4/2010 | Joseph |
| 2010/0100315 A1 | 4/2010 | Davidson |
| 2010/0103165 A1 | 4/2010 | Lee |
| 2010/0104199 A1 | 4/2010 | Zhang |
| 2010/0149418 A1 | 6/2010 | Freed |
| 2010/0153146 A1 | 6/2010 | Angell |
| 2010/0157061 A1 | 6/2010 | Katsman |
| 2010/0191411 A1 | 7/2010 | Cook |
| 2010/0201875 A1 | 8/2010 | Rood |
| 2010/0220892 A1 | 9/2010 | Kawakubo |
| 2010/0250020 A1 | 9/2010 | Lee |
| 2010/0250060 A1 | 9/2010 | Maeda |
| 2010/0250116 A1 | 9/2010 | Yamaguchi |
| 2010/0253918 A1 | 10/2010 | Seder |
| 2010/0268415 A1 | 10/2010 | Ishikawa |
| 2010/0283633 A1 | 11/2010 | Becker |
| 2010/0312464 A1 | 12/2010 | Fitzgerald |
| 2011/0035139 A1 | 2/2011 | Konlditslotis |
| 2011/0043624 A1 | 2/2011 | Haug |
| 2011/0060496 A1 | 3/2011 | Nielsen |
| 2011/0077028 A1 | 3/2011 | Wilkes |
| 2011/0091079 A1 | 4/2011 | Yu-Song |
| 2011/0093159 A1 | 4/2011 | Boling |
| 2011/0112995 A1 | 5/2011 | Chang |
| 2011/0121960 A1 | 5/2011 | Tsai |
| 2011/0125365 A1 | 5/2011 | Larschan |
| 2011/0130916 A1 | 6/2011 | Mayer |
| 2011/0140884 A1 | 6/2011 | Santiago |
| 2011/0145042 A1 | 6/2011 | Green |
| 2011/0153367 A1 | 6/2011 | Amigo |
| 2011/0161116 A1 | 6/2011 | Peak |
| 2011/0166773 A1 | 7/2011 | Raz |
| 2011/0173015 A1 | 7/2011 | Chapman |
| 2011/0208428 A1 | 8/2011 | Matsubara |
| 2011/0212717 A1 | 9/2011 | Rhoads |
| 2011/0213628 A1 | 9/2011 | Peak |
| 2011/0224891 A1 | 9/2011 | Iwuchukwu |
| 2011/0251752 A1 | 10/2011 | DeLarocheliere |
| 2011/0251782 A1 | 10/2011 | Perkins |
| 2011/0254676 A1 | 10/2011 | Marumoto |
| 2011/0257882 A1 | 10/2011 | McBurney |
| 2011/0273568 A1 | 11/2011 | Lagassey |
| 2011/0282542 A9 | 11/2011 | Nielsen |
| 2011/0283223 A1 | 11/2011 | Vaittinen |
| 2011/0304446 A1 | 12/2011 | Basson |
| 2012/0021386 A1 | 1/2012 | Anderson |
| 2012/0035788 A1 | 2/2012 | Trepagnier |
| 2012/0041675 A1 | 2/2012 | Juliver |
| 2012/0046803 A1 | 2/2012 | Inou |
| 2012/0071140 A1 | 3/2012 | Oesterling |
| 2012/0078063 A1 | 3/2012 | Moore-Ede |
| 2012/0081567 A1 | 4/2012 | Cote |
| 2012/0100509 A1 | 4/2012 | Gunderson |
| 2012/0109447 A1 | 5/2012 | Yousefi |
| 2012/0123806 A1 | 5/2012 | Schumann |
| 2012/0134547 A1 | 5/2012 | Jung |
| 2012/0150436 A1 | 6/2012 | Rossano |
| 2012/0176234 A1 | 7/2012 | Taneyhill |
| 2012/0190001 A1 | 7/2012 | Knight |
| 2012/0198317 A1 | 8/2012 | Eppolito |
| 2012/0210252 A1 | 8/2012 | Fedoseyeva |
| 2012/0277950 A1 | 11/2012 | Plante |
| 2012/0283895 A1 | 11/2012 | Noda |
| 2012/0330528 A1 | 12/2012 | Schwindt |
| 2013/0004138 A1 | 1/2013 | Kilar |
| 2013/0006469 A1 | 1/2013 | Green |
| 2013/0021148 A1 | 1/2013 | Cook |
| 2013/0030660 A1 | 1/2013 | Fujimoto |
| 2013/0073112 A1 | 3/2013 | Phelan |
| 2013/0073114 A1 | 3/2013 | Nemat-Nasser |
| 2013/0096731 A1 | 4/2013 | Tamari |
| 2013/0145269 A1 | 6/2013 | Latulipe |
| 2013/0151980 A1 | 6/2013 | Lee |
| 2013/0197774 A1 | 8/2013 | Denson |
| 2013/0274950 A1 | 10/2013 | Richardson |
| 2013/0317711 A1 | 11/2013 | Plante |
| 2013/0332004 A1 | 12/2013 | Gompert |
| 2013/0345927 A1 | 12/2013 | Cook |
| 2014/0025225 A1 | 1/2014 | Armitage |
| 2014/0025254 A1 | 1/2014 | Plante |
| 2014/0032062 A1 | 1/2014 | Baer |
| 2014/0046550 A1 | 2/2014 | Palmer |
| 2014/0047371 A1 | 2/2014 | Palmer |
| 2014/0058583 A1 | 2/2014 | Kesavan |
| 2014/0094992 A1 | 4/2014 | Lambert |
| 2014/0098228 A1 | 4/2014 | Plante |
| 2014/0152828 A1 | 6/2014 | Plante |
| 2014/0226010 A1 | 8/2014 | Molin |
| 2014/0279707 A1 | 9/2014 | Joshua |
| 2014/0280204 A1 | 9/2014 | Avery |
| 2014/0300739 A1 | 10/2014 | Mimar |
| 2014/0309849 A1 | 10/2014 | Ricci |
| 2014/0335902 A1 | 11/2014 | Guba |
| 2014/0336916 A1 | 11/2014 | Yun |
| 2015/0035665 A1 | 2/2015 | Plante |
| 2015/0057836 A1 | 2/2015 | Plante |
| 2015/0105934 A1 | 4/2015 | Palmer |
| 2015/0112542 A1 | 4/2015 | Fuglewicz |
| 2015/0112545 A1 | 4/2015 | Binion |
| 2015/0134226 A1 | 5/2015 | Palmer |
| 2015/0135240 A1 | 5/2015 | Shibuya |
| 2015/0189042 A1 | 7/2015 | Sun |
| 2015/0222449 A1 | 8/2015 | Salinger |
| 2015/0317846 A1 | 11/2015 | Plante |

FOREIGN PATENT DOCUMENTS

| | | |
|---|---|---|
| CA | 2692415 | 8/2011 |
| CA | 2692415 A1 | 8/2011 |
| DE | 4416991 A1 | 11/1995 |
| DE | 20311262 | 9/2003 |
| DE | 202005008238 | 8/2005 |
| DE | 102004004669 A1 | 12/2005 |
| EP | 0708427 A2 | 4/1996 |
| EP | 0840270 A2 | 5/1998 |

(56) References Cited

FOREIGN PATENT DOCUMENTS

| | | |
|---|---|---|
| EP | 0848270 A2 | 6/1998 |
| EP | 1170697 A2 | 1/2002 |
| EP | 1324274 A2 | 7/2003 |
| EP | 1355278 A1 | 10/2003 |
| EP | 1427165 A2 | 6/2004 |
| EP | 1818873 A1 | 8/2007 |
| EP | 2104075 | 9/2009 |
| EP | 2320387 | 5/2011 |
| EP | 2407943 | 1/2012 |
| GB | 2268608 A | 1/1994 |
| GB | 2402530 | 12/2004 |
| GB | 2402530 A | 12/2004 |
| GB | 2446994 | 8/2008 |
| GB | 2451485 | 2/2009 |
| GB | 2447184 B | 6/2011 |
| JP | 58085110 | 5/1983 |
| JP | S5885110 A | 5/1983 |
| JP | 62091092 | 4/1987 |
| JP | S6291092 A | 4/1987 |
| JP | S62166135 A | 7/1987 |
| JP | 02056197 | 2/1990 |
| JP | H0256197 A | 2/1990 |
| JP | H04257189 A | 9/1992 |
| JP | H05137144 A | 6/1993 |
| JP | H08124069 A | 5/1996 |
| JP | H09163357 A | 6/1997 |
| JP | H09272399 A | 10/1997 |
| JP | 10076880 | 3/1998 |
| JP | H1076880 A | 3/1998 |
| JP | 2002191017 A | 7/2002 |
| JP | 5294188 | 9/2013 |
| KR | 1000588169 | 12/2000 |
| WO | 8809023 A1 | 11/1988 |
| WO | 9005076 | 5/1990 |
| WO | 9427844 | 12/1994 |
| WO | 9600957 A1 | 1/1996 |
| WO | 9701246 | 1/1997 |
| WO | 9726750 A1 | 7/1997 |
| WO | 9937503 | 7/1999 |
| WO | 9940545 A1 | 8/1999 |
| WO | 9962741 | 12/1999 |
| WO | 0007150 A1 | 2/2000 |
| WO | 0048033 | 2/2000 |
| WO | 0077620 | 2/2000 |
| WO | 0028410 A1 | 5/2000 |
| WO | 0123214 | 4/2001 |
| WO | 0125054 | 4/2001 |
| WO | 0146710 A2 | 6/2001 |
| WO | 03045514 | 6/2003 |
| WO | 2006022824 A2 | 3/2006 |
| WO | 2007067767 | 1/2007 |
| WO | 2009081234 | 7/2009 |
| WO | 2011055743 A1 | 5/2011 |
| WO | 2013072939 | 5/2013 |
| WO | 2013159853 | 10/2013 |

OTHER PUBLICATIONS

"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"Responsive Claim Construction and Identification of Extrinsic Evidence of Defendani/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Adaptec published and sold its VideoOh! DVD software USB 2.0 Edition in at least Jan. 24, 2003. (1 pg.).
Ambulance Companies Use Video Technology to Improve Driving Behavior, Ambulance Industry Journal, Spring 2003 (2 pgs.).
Amended Complaint for Patent Infringement, Trade Secret Misappropriation, Unfair Competition and Conversion in *DriveCam, Inc.* v. *SmartDrive Systems, Inc.*, Case No. 3:11-CV-00997-H-RBB, for the Southern District of California, Document 34, filed Oct. 20, 2011, pp. 1-15.
Amendment filed Dec. 23, 2009 during prosecution of U.S. Appl. No. 11/566,424 (13 pgs.).
Answer to Amended Complaint; Counterclaims; and Demand for Jury Trial in *DriveCam, Inc.* v. *SmartDrive Systems, Inc.*, Case No. 3:11-CV-00997 H (RBB), for the Southern District of California, Document 47, filed Dec. 13, 2011, pp. 1-15.
U.S. Appl. No. 11/296,906, filed Dec. 8, 2005, File History (279 pgs.).
U.S. Appl. No. 11/297,669, filed Dec. 8, 2005, File History (183 pgs.).
U.S. Appl. No. 11/297,889, filed Dec. 8, 2005, File History (77 pgs.).
U.S. Appl. No. 11/298,069, filed Dec. 9, 2005, File History (105 pgs.).
U.S. Appl. No. 11/299,028, filed Dec. 9, 2005, File History (181 pgs.).
U.S. Appl. No. 11/593,659, filed Nov. 7, 2006, File History (296 pgs.).
U.S. Appl. No. 11/593,682, filed Nov. 7, 2006, File History (173 pgs.).
U.S. Appl. No. 11/593,882, filed Nov. 7, 2006, File History (94 pgs.).
U.S. Appl. No. 11/595,015, filed Nov. 9, 2006, File History (171 pgs.).
U.S. Appl. No. 11/637,754, filed Dec. 13, 2006, File History (241 pgs.).
U.S. Appl. No. 11/637,755, filed Dec. 13, 2006, File History (171 pgs.).
Bill, 'DriveCam—FAQ', Dec. 12, 2003 (3 pgs.).
Bill Siuru, 'DriveCam Could Save You Big Bucks', Land Line Magazine, May-Jun. 2000 (1 pg.).
Canadian Office Action issued in Application No. 2,632,685 dated Jan. 30, 2015; 5 pages.
Chris Woodyard, 'Shuttles save with DriveCam', Dec. 9, 2003 (1 pg.).
Dan Carr, Flash Video Template: Video Presentation with Navigation, Jan. 16, 2006, http://www.adobe.com/devnet/flash/articles/vidtemplate_mediapreso_flash8.html (13 pgs.).
Dan Maher, "DriveCam Taking Risk Out of Driving", DriveCam brochure folder, Jun. 6, 2005, 6 pages.
David Cullen, 'Getting a real eyeful', Fleet Owner Magazine, Feb. 2002 (1 pg.).
David Maher, 'DriveCam Brochure Folder', Jun. 6, 2005 (2 pg.).
David Maher, "DriveCam Brochure Folder", Jun. 8, 2005 (2 pg.).
David Vogeleer et al., Macromedia Flash Professional 8UNLEASHED (Sams Oct. 12, 2005). (4 pgs.).
Del Lisk, 'DriveCam Training Handout Ver4', Feb. 3, 2005 (16 pgs.).
Drivecam, Inc., User's Manual for Drivecam Video Systems' Hindsight 20/20 Software Version 4.0 (2003). (54 pgs.).
DriveCam, Inc.'s Infringement Contentions Exhibit A, U.S. Pat. No. 6,389,340, Document 34.1, Oct. 20, 2011. (10 pgs.).
DriveCam, Inc.'s Infringement Contentions Exhibit B, U.S. Pat. No. 7,659,827. Aug. 19, 2011. (29 pgs.).
DriveCam, Inc.'s Infringement Contentions Exhibit B, U.S. Pat. No. 7,804,426, Document 34.2, Oct. 20, 2011. (20 pg.).
DriveCam, Inc.'s Infringement Contentions Exhibit C, U.S. Pat. No. 7,659,827, Document 34.3, Oct. 20, 2011. (17 pgs.).
DriveCam, Inc.'s Infringement Contentions Exhibit C, U.S. Pat. No. 7,804,426. Aug. 19, 2011. (47 pgs.).

(56) References Cited

OTHER PUBLICATIONS

DriveCam, Inc.'s Infringement Contentions Exhibit D, Document 34.4, Oct. 20, 2011. (2 pgs.).
DriveCam—Illuminator Data Sheet, Oct. 2, 2004. (1 pg.).
Drivecam.com as retrieved by the Internet Wayback Machine as of Mar. 5, 2005(1 pg.).
DriveCam's Disclosure of Asserted Claims and Preliminary Infringement Contentions in *DriveCam, Inc.* v. *SmartDrive Systems, Inc.*, Case No. 3:11-CV-00997-H-RBB, for the Southern District of California. Aug. 19, 2011. (6 pgs.).
DriveCam Driving Feedback System, Mar. 15, 2004 (12 pgs.).
DriveCam Extrinsic Evidence with Patent LR 4.1 .a Disclosures, Nov. 3, 2011. (1 pg.).
DriveCam Extrinsic Evidence with Patent LR 4.1 .a Disclosures, Nov. 8, 2011. (1 pg.).
Driver Feedback System, Jun. 12, 2001 (1 pg.).
European Examination Report issued in EP 07772812.9 on Jan. 22, 2015; 5 pages.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 53, filed Dec. 20, 2011, pp. 1-48.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Document 55, filed Jan. 1, 2012, pp. 86-103.
First Amended Answer to Amended Complaint and First Amended Counterclaims; and Demand for Jury Trial in *DriveCam, Inc.* v. *SmartDrive Systems, Inc.*, Case No. 3:11-CV-00997 H (RBB), for the Southern District of California, Exhibit A, Document 55, filed Jan. 3, 2012, pp. 49-103.
Franke, U., et al., Autonomous Driving Goes Downtown, IEEE Intelligent Systems, 13(6):40-48 (1988); Digital Object Identifier 10.1109/5254.736001.
Gallagher, B., et al., Wireless Communications for Vehicle Safety: Radio Link Performance and Wireless Connectivity Methods, Vehicular Technology Magazine, IEEE, 1(4):4-24 (2006); Digital Object Identifier 10.1109/MVT.2006.343641.
Gandhi, T., et al., Pedestrian Protection Systems: Issues, Survey, and Challenges, IEEE Transactions on Intelligent Transportation Systems, 8(3):413-430 (2007); Digital Object Identifier 10.1109/TITS.2007.903444.
Gary and Sophia Rayner, Final Report for Innovations Deserving Exploratory Analysis (IDEA) Intelligent Transportation Systems (ITS) Programs' Project 84, I-Witness Black Box Recorder, San Diego, CA. Nov. 2001. (19 pgs.).
GE published its VCR User's Guide for Model VG4255 in 1995. (44 pgs.).
Glenn Oster, 'Hindsight 20/20 v4.0 Software Installation', 1 of 2, Jun. 20, 2003 (2 pgs.).
Glenn Oster, 'HindSight 20/20 v4.0 Software Installation', 2 of 2, Jun. 20, 2003. (54 pgs.).
Glenn Oster, 'Illuminator Installation', Oct. 3, 2004 (2 pgs.).
Hans Fantel, Video; Search Methods Make a Difference in Picking VCR's, NY Times, Aug. 13, 1989. (1 pg.).
I/O Port Racing Supplies' website discloses using Traqmate's Data Acquisition with Video Overlay system in conjunction with professional driver coaching sessions (available at http://www.ioportracing.com/Merchant2/merchant.mvc?Screen=CTGY &Categorys- ub.--Code=coaching)., printed from site on Jan. 11, 2012. (4 pgs.).
Inovate Motorsports, OT-1 16 Channel OBD-II Interface User Manual, Version 1.0, Nov. 28, 2007, pp. 3, 4, 21 & 27.
Interior Camera Data Sheet, Oct. 26, 2001 (2 pgs.).
International Search Report and Written Opinion issued in PCT/US07/68325 on Feb. 27, 2008. (10 pgs.).
International Search Report and Written Opinion issued in PCT/US07/68325 on Feb. 27, 2008. (2 pgs.).
International Search Report and Written Opinion issued in PCT/US07/68328 on Oct. 15, 2007. (2 pgs.).
International Search Report and Written Opinion issued in PCT/US07/68329 on Mar. 3, 2008. (10 pgs.).
International Search Report and Written Opinion issued in PCT/US07/68332 on Mar. 3, 2008. (8 pgs.).
International Search Report and Written Opinion issued in PCT/US07/68334 on Mar. 5, 2008. (11 pgs.).
International Search Report for PCT/US2006/47055, mailed Mar. 20, 2008 (2 pages).
International Search Report issued in PCT/US2006/47042 mailed Feb. 25, 2008 (3pgs.).
J. Gallagher, 'Lancer Recommends Tech Tool', Insurance and Technology Magazine, Feb. 2002 (1 pg.).
Jean (DriveCam vendor), 'DC Data Sheet', Nov. 6, 2002. (1 pg.).
Jean (DriveCam vendor), 'DriveCam brochure', Nov. 6, 2002. (4 pgs.).
Jean (DriveCam vendor), 'Feedback Data Sheet', Nov. 6, 2002. (1 pg.).
Jean (DriveCam vendor), 'Hindsight 20-20 Data Sheet', Nov. 4, 2002 (2 pg.).
Jean (DriveCam vendor) "DriveCam Driving Feedback System", DriveCam brochure, Nov. 6, 2002, Document #6600128-1, 2 pages.
Jessyca Wallace, 'Analyzing and Processing DriveCam Recorded Events', Oct. 6, 2003 (8 pgs.).
Jessyca Wallace, 'Overview of the DriveCam Program', Dec. 15, 2005 (13 pgs.).
Jessyca Wallace, 'The DriveCam Driver Feedback System', Apr. 6, 2004 (21 pgs.).
Joint Claim Construction Chart, U.S. Pat. No. 6,389,340, 'Vehicle Data Recorder' for Case No. 3:11-CV-00997-H-RBB, Document 43-1, filed Dec. 1, 2011, pp. 1-33.
Joint Claim Construction Worksheet, U.S. Pat. No. 6,389,340, 'Vehicle Data Reporter' for Case No. 3:11-CV-00997-H-RBB, Document 44-1, filed Dec. 1, 2011, pp. 1-10.
Joint Claim Construction Worksheet in *DriveCam, Inc.* v. *SmartDrive Systems, Inc.*, Case No. 3:11-CV-00997 H (RBB), for the Southern District of California, Document 44, filed Dec. 1, 2011, pp. 1-2.
Joint Motion for Leave to Supplement Disclosure of Asserted Claims and Preliminary Infringement Contentions in *DriveCam, Inc.* v. *SmartDrive Systems, Inc.*, Case No. 3:11-cv-00997-H-RBB, Document 29, filed Oct. 12, 2011, pp. 1-7.
Julie Stevens, 'DriveCam Services', Nov. 15, 2004 (9 pgs.).
Julie Stevens, 'Program Support Roll-Out & Monitoring', Jul. 13, 2004 (2 pgs.).
Jung, Sang-Hack, et al., Egomotion Estimation in Monocular Infrared Image Sequence for Night Vision Applications, IEEE Workshop on Applications of Computer Vision (WACV '07), Feb. 2007, 6 pgs.; Digital Object Identifier 10.1109/WACV.2007.20.
JVC Company of America, JVC Video Cassette Recorder HR-IP820U Instructions (1996). (44 pgs.).
Kamijo, S., et al., A Real-Time Traffic Monitoring System by Stochastic Model Combination, IEEE International Conference on Systems, Man and Cybernetics, 4:3275-3281 (2003).
Kamijo, S., et al., An Incident Detection System Based on Semantic Hierarchy, Proceedings of the 7th International IEEE Intelligent Transportation Systems Conference, Oct. 3-6, 2004, pp. 853-858; Digital Object Identifier 10.1109/ITSC.2004.1399015.
Karen, 'Downloading Options to HindSight 20120', Aug. 6, 2002. (15 pgs.).
Karen, 'Managers Guide to the DriveCam Driving Feedback System', Jul. 30, 2002 (11 pgs.).
Kathy Latus (Latus Design), 'Case Study—Cloud 9 Shuttle', Sep. 23, 2005 (1 pg.).
Kathy Latus (Latus Design), 'Case Study—Lloyd Pest Control', Jul. 19, 2005 (1 pg.).
Kathy Latus (Latus Design), 'Case Study—Time Warner Cable', Sep. 23, 2005. (1 pg.).
Ki, Yong-Kul, et al., A Traffic Accident Detection Model using Metadata Registry, Proceedings of the Fourth International Confer-

(56) References Cited

OTHER PUBLICATIONS ence on Software Engineering Research, Management and Applications; Aug. 9-11, 2006 pp. 255-259 Digital Object Identifier 10.1109/SERA.2006.8.
Kitchin, Charles. "Understanding accelerometer scale factor and offset adjustments." Analog Devices (1995). (4 pgs.).
Lin, Chin-Teng et al., EEG-based drowsiness estimation for safety driving using independent component analysis; IEEE Transactions on Circuits and Systems—I: Regular Papers, 52(12):2726-2738 (2005); Digital Object Identifier 10.1109/TCSI.2005.857555.
Lisa McKenna, 'A Fly on the Windshield?', Pest Control Technology Magazine, Apr. 2003 (2 pgs.).
Miller, D.P., Evaluation of Vision Systems for Teleoperated Land Vehicles. Control Systems Magazine, IEEE, 8(3):37-41 (1988); Digital Identifier 10.1109/37.475.
Munder, S., et al., Pedestrian Detection and Tracking Using a Mixture of View-Based Shape-Texture Models, IEEE Transactions on Intelligent Transportation Systems, 9(2):333-343 (2008); Digital Identifier 10.1109/TITS.2008.922943.
Notice of Allowance Allowance for U.S. Appl. No. 14/036,299, mailed Mar. 20, 2015, 5 pages.
Notice of Allowance Application for U.S. Appl. No. 11/566,424, mailed Feb. 26, 2010, 6 pages.
Notice of Allowance for U.S. Appl. No. 11/377,164, mailed Dec. 3, 2014, 5 pages.
Notice of Allowance for U.S. Appl. No. 11/377,164, mailed Feb. 13, 2015, 2 pages.
Notice of Allowance for U.S. Appl. No. 11/377,164, mailed Feb. 25, 2014, 2 pages.
Notice of Allowance for U.S. Appl. No. 11/377,164, mailed Nov. 18, 2013, 7 pages.
Notice of Allowance for U.S. Appl. No. 11/377,167, mailed Apr. 1, 2015, 7 pages.
Notice of Allowance for U.S. Appl. No. 11/800,876, mailed Apr. 19, 2012, 8 pages.
Notice of Allowance for U.S. Appl. No. 13/957,810, mailed Jun. 8, 2015, 10 pages.
Panasonic Corporation, Video Cassette Recorder (VCR) Operating Instructions for Models No. PV-V4020/PV-V4520. (40 pgs.).
Passenger Transportation Mode Brochure, May 2, 2005. (2 pgs.).
Patent Abstracts of Japan vol. 007, No. 180 (P-215), Aug. 9, 1983 & JP 58 085110 A (Mitsuhisa Ichikawa), May 21, 1983 (1 pg.).
Patent Abstracts of Japan vol. 011, No. 292 (E-543), Sep. 19, 1987 & JP 62 091092 A (OK ENG:KK), Apr. 25, 1987 (1 pg.).
Patent Abstracts of Japan vol. 012, No. 001 (M-656), Jan. 6, 1988 & JP 62 166135 A (Fuji Electric Co Ltd), Jul. 22, 1987 (1 pg.).
Patent Abstracts of Japan vol. 014, No. 222 (E-0926), May 10, 1990 & JP 02 056197 A (Sanyo Electric Co Ltd), Feb. 26, 1990 (1 pg.).
Patent Abstracts of Japan vol. 017, No. 039 (E-1311), Jan. 25, 1993 & JP 04 257189 A (Sony Corp), Sep. 11, 1992 (1 pg.).
Patent Abstracts of Japan vol. 017, No. 521 (E-1435), Sep. 20, 1993 & JP 05 137144 A (Kyocera Corp), Jun. 1, 1993 (7 pgs.).
Patent Abstracts of Japan vol. 1996, No. 09, Sep. 30, 1996 & JP 08 124069 A (Toyota Motor Corp), May 17, 1996 (15 pgs.).
Patent Abstracts of Japan vol. 1997, No. 10, Oct. 31, 1997 & JP 09 163357 A (Nippon Soken Inc), Jun. 20, 1997 (1 pg.).
Patent Abstracts of Japan vol. 1998, No. 02, Jan. 30, 1998 & JP 09 272399 A (Nippon Soken Inc), Oct. 21, 1997 (1 pg.).
Patent Abstracts of Japan vol. 1998, No. 8, Jun. 30, 1998 & JP 10 076880 A (Muakami Corp), Mar. 24, 1998 (1 pg.).
PCT/US2010/022012, Invitation to Pay Additional Fees with Communication of Partial International Search, Jul. 21, 2010. (4 pgs.).
Peter G. Thurlow, Letter (including exhibits) Regarding Patent Owner's Response to Initial Office Action in Ex Parte Reexamination, Mar. 27, 2012. (78 pgs.).
Preliminary Claim Construction and Identification of Extrinsic Evidence of Defendant/Counterclaimant SmartDriveSystems, Inc. in *DriveCam, Inc. v. SmartDrive Systems, Inc.*, Case No. 3:11-CV-00997-H (RBB), for the Southern District of California. Nov. 8, 2011. (13 pgs.).

Quinn Maughan, 'DriveCam Enterprise Services', Jan. 5, 2006 (2 pgs.).
Quinn Maughan, 'DriveCam Managed Services', Jan. 5, 2006. (2 pgs.).
Quinn Maughan, 'DriveCam Standard Edition', Jan. 5, 2006. (2 pgs.).
Quinn Maughan, 'DriveCam Unit Installation', Jul. 21, 2005 (9 pgs.).
Quinn Maughan, 'Enterprise Services', Apr. 17, 2006 (2 pgs.).
Quinn Maughan, 'Enterprise Services', Apr. 7, 2006 (2 pgs.).
Quinn Maughan, 'Hindsight Installation Guide', Sep. 29, 2005 (55 pgs.).
Quinn Maughan, 'Hindsight Users Guide', Jun. 7, 2005 (80 pgs.).
Ronnie Rittenberry, 'Eyes on the Road', Jul. 2004 (2 pgs.).
Supplement to DriveCam's Disclosure of Asserted Claims and Preliminary Infringement Contentions' in *DriveCam, Inc. v. SmartDrive Systems, Inc.*, Case No. 3:11-CV-00997-H-RBB, for the Southern District of California. Oct. 14, 2011. (7 pgs.).
The DriveCam, Nov. 6, 2002. (2 pgs.).
The DriveCam, Nov. 8, 2002 (2 pgs.).
Traqmate GPS Data Acquisition's Traqmate Data Acquisition with Video Overlay system was used to create a video of a driving event on Oct. 2, 2005 (available at http://www.trackvision.net/phpBB2/viewtopic.php?t=51&sid=1184fbbcbe3be5c87ffa0f2ee6e2da76), printed from site on Jan. 11, 2012. (4 pgs.).
Trivinci Systems, LLC, Race-Keeper Systems User Guide, Jan. 2011, v1, 1.02, pp. 34 and 39.
U.S. Appl. No. 12/691,639, entitled 'Driver Risk Assessment System and Method Employing Selectively Automatic Event Scoring', filed Jan. 21, 2010. (52 pgs.).
U.S. Appl. No. 11/377,167, Final Office Action dated Nov. 8, 2013. (19 pgs.).
U.S. Appl. No. 11/377,157, filed Mar. 16, 2006 entitled, "Vehicle Event Recorder Systems and Networks Having Parallel Communications Links" (28 pgs.).
U.S. Appl. No. 11/377,167, filed Mar. 16, 2006 entitled, "Vehicle Event Recorder Systems and Networks Having Integrated Cellular Wireless Communications Systems" (29 pgs.).
USPTO Final Office Action for U.S. Appl. No. 11/296,906, mailed Aug. 8, 2012, 15 pages.
USPTO Final Office Action for U.S. Appl. No. 11/297,669, mailed Nov. 7, 2011, 15 pages.
USPTO Final Office Action for U.S. Appl. No. 12/096,591, mailed Dec. 5, 2014, 23 pages.
USPTO Final Office Action for U.S. Appl. No. 12/096,591, mailed Jul. 18, 2012, 15 pages.
USPTO Final Office Action for U.S. Appl. No. 12/096,591, mailed Nov. 7, 2013, 14 pages.
USPTO Final Office Action for U.S. Appl. No. 13/957,810, mailed Jun. 27, 2014, 22 pages.
USPTO Final Office Action for U.S. Appl. No. 13/957,810, mailed Jun. 27, 2014, 24 pages.
USPTO Final Office Action for U.S. Appl. No. 14/036,299, mailed Feb. 24, 2015, 9 pages.
USPTO Non-Final Office Action for U.S. Appl. No. 11/296,906, mailed Apr. 2, 2009, 7 pages.
USPTO Non-Final Office Action for U.S. Appl. No. 11/296,906, mailed Apr. 8, 2014, 19 pages.
USPTO Non-Final Office Action for U.S. Appl. No. 11/296,906, mailed Jun. 12, 2012, 13 pages.
USPTO Non-Final Office Action for U.S. Appl. No. 11/296,906, mailed Nov. 6, 2009, 9 pages.
USPTO Non-Final Office Action for U.S. Appl. No. 11/297,669, mailed Apr. 28, 2011, 11 pages.
USPTO Non-Final Office Action for U.S. Appl. No. 11/299,028, mailed Apr. 24, 2008, 9 pages.
USPTO Non-Final Office Action for U.S. Appl. No. 11/377,164, mailed Apr. 7, 2014, 7 pages.
USPTO Non-Final Office Action for U.S. Appl. No. 11/377,164, mailed Aug. 18, 2014, 5 pages.
USPTO Non-Final Office Action for U.S. Appl. No. 11/377,164, mailed Nov. 19, 2007, 7 pages.

(56) References Cited

OTHER PUBLICATIONS

USPTO Non-Final Office Action for U.S. Appl. No. 11/377,164, mailed Nov. 25, 2011, 9 pages.
USPTO Non-Final Office Action for U.S. Appl. No. 11/377,164, mailed Sep. 10, 2012, 10 pages.
USPTO Non-Final Office Action for U.S. Appl. No. 11/377,164, mailed Sep. 11, 2008, 8 pages.
USPTO Non-Final Office Action for U.S. Appl. No. 11/377,167, mailed Jun. 27, 2013, 11 pages.
USPTO Non-Final Office Action for U.S. Appl. No. 11/377,167, mailed Jun. 5, 2008, 11 pages.
USPTO Non-Final Office Action for U.S. Appl. No. 11/800,876, mailed Dec. 1, 2010, 12 pages.
USPTO Non-Final Office Action for U.S. Appl. No. 11/800,876, mailed Dec. 20, 2011, 8 pages.
USPTO Non-Final Office Action for U.S. Appl. No. 12/096,591, mailed Jun. 14, 2011, 8 pages.
USPTO Non-Final Office Action for U.S. Appl. No. 12/096,591, mailed Mar. 27, 2013, 16 pages.
USPTO Non-Final Office Action for U.S. Appl. No. 12/096,591, mailed May 20, 2014, 19 pages.
USPTO Non-Final Office Action for U.S. Appl. No. 13/957,810, mailed Apr. 17, 2015, 6 pages.
USPTO Non-final Office Action for U.S. Appl. No. 13/957,810, mailed Nov. 27, 2013, 18 pages.
USPTO Non-Final Office Action for U.S. Appl. No. 14/036,299, mailed Aug. 12, 2014. (14 pgs.).
USPTO Non-Final Office Action for U.S. Appl. No. 11/296,907, Mailed Mar. 22, 2007 (17 pages).
USPTO Non-final Office Action mailed Aug. 27, 2009 during prosecution of U.S. Appl. No. 11/566,424 (25 pgs.).
USPTO Non-Final Office Action mailed Nov. 27, 2013 in U.S. Appl. No. 13/957,810, filed Aug. 2, 2013. (19 pgs.).
Veeraraghavan, H., et al., Computer Vision Algorithms for Intersection Monitoring, IEEE Transactions on Intelligent Transportation Systems, 4(2):78-89 (2003); Digital Object Identifier 10.1109/TITS.2003.821212.
Wijesoma, W.S., et al., Road Curb Tracking in an Urban Environment, Proceedings of the Sixth International Conference of Information Fusion, 1:261-268 (2003).
Written Opinion issued in PCT/US07/68328 on Oct. 15, 2007. (3 pgs.).
Written Opinion of the International Searching Authority for PCT/US2006/47042. Mailed Feb. 25. 2008 (5 pages).
Written Opinion of the International Searching Authority for PCT/US2006/47055, Mailed Mar. 20, 2008 (5 pages).
USPTO Non-Final Office Action mailed Jan. 4, 2016 in U.S. Appl. No. 14/529,134, filed Oct. 30, 2014 (65 pgs).
PCT International Search Report and Written Opinion for PCT/US15/60721 dated February 26, 2016, 11 pages.
Trivinci Systems, LLC, "Race-Keeper System User Guide", V1 .1.02, Jan. 2011, p. 21.
PCT International Search Report and Written Opinion for PCT/IB16/51863, dated Sep. 16, 2016.

VEHICLE EVENT RECORDER SYSTEMS AND NETWORKS HAVING INTEGRATED CELLULAR WIRELESS COMMUNICATIONS SYSTEMS

BACKGROUND OF THESE INVENTIONS

Field

The following inventions disclosure is generally concerned with vehicle event recorder systems and specifically concerned with vehicle event recorder systems having cellular wireless transceivers which couple with wireless communications networks.

Prior Art

The inventions presented in U.S. Pat. No. 6,947,817 by inventor Diem for nonintrusive diagnostic tools for testing oxygen sensor operation relates to a diagnostic system for testing a vehicle where such systems include a wireless communications link between a vehicle any remote network of server computers. In particular, a WiFi type access points allowed an analyzer to communicate by way the Internet with a server computer hosting and oxygen sensor SOAP (simple object access protocol) service. In a nutshell, the system relates to smog sensors for automobiles which communicate with remote servers by way of a WiFi communications links.

Video surveillance systems are used to provide video records of events, incidents, happenings, et cetera in locations of special interest. For example, retail banking offices are generally protected with video surveillance systems which provide video evidence in case of robbery. While video surveillance systems are generally used in fixed location scenarios, mobile video surveillance systems are also commonly used today.

In particular, video systems have been configured for use in conjunction with an automobile and especially for use with police cruiser type automobiles. As a police cruiser is frequently quite near the scene of an active crime, important image information may be captured by video cameras installed on the police cruiser. Specific activity of interest which may occur about an automobile is not always associated with crime and criminals. Sometimes events which occur in the environments immediately about an automobile are of interest for reasons having nothing to do with crime. In example, a simple traffic accident where two cars come together in a collision may be the subject of video evidence of value. Events and circumstances leading up to the collision accident may be preserved such that an accurate reconstruction can be created. This information is useful when trying come to a determination as to cause, fault and liability. As such, general use of video systems in conjunction with automobiles is quickly becoming an important tool useful for the protection of all. Some examples of the systems are illustrated below with reference to pertinent documents.

Inventor Schmidt presents in U.S. Pat. No. 5,570,127, a video recording system for a passenger vehicle, namely a school bus, which has two video cameras one for an inside bus view and one for a traffic view, a single recorder, and a system whereby the two cameras are multiplexed at appropriate times, to the recording device. A switching signal determines which of the two video cameras is in communication with the video recorder so as to view passengers on the passenger vehicle at certain times and passing traffic at other times.

Thomas Doyle of San Diego, Calif. and QUALCOMM Inc. also of San Diego, present an invention for a method and apparatus for detecting fault conditions in a vehicle data recording device to detect tampering or unauthorized access, in U.S. Pat. No. 5,586,130. The system includes vehicle sensors for monitoring one or more operational parameters of the vehicle. The fault detection technique contemplates storing a current time value at regular intervals during periods in which the recording device is provided with a source of main power. Inventor Doyle also teaches in the U.S. Pat. No. 5,815,071, a method and apparatus for monitoring parameters of vehicle electronic control units.

A "computerized vehicle log" is presented by Dan Kikinis of Saratoga Calif. in U.S. Pat. No. 5,815,093. The vehicle accident recording system employs a digital camera connected to a controller in nonvolatile memory, and an accident sensing interrupter. The oldest memory is overwritten by the newest images, until an accident is detected at which time the memory is blocked from further overwrites to protect the more vital images, which may include important information about the accident. Mr Kikinis instructs that in preferred embodiments, the system has a communications port whereby stored images are downloaded after an accident to a digital device capable of displaying images. This feature is described in greater detail in the specification which indicates a wired download to a server having specialized image handling and processing software thereon.

Inventor Mr. Turner of Compton, Calif., no less, teaches an antitheft device for an automotive vehicle having both an audible alarm and visual monitor system. Video monitor operators are responsible for monitoring and handling an emergency situation and informing a 911 emergency station. This system is presented in U.S. Pat. No. 6,002,326.

A vehicle accident video recorder, in particular, a railroad vehicle accident video recorder, is taught by inventors Cox et al. In this system, a method and monitoring unit for recording the status of the railroad vehicle prior to a potential accident is presented. The monitoring unit continuously monitors the status of an emergency brake of the railroad vehicle and the status of a horn of the railroad vehicle. Video images are recorded and captured for a predetermined period of time after detecting that the emergency brake or horn blast has been applied as an event trigger. This invention is the subject of U.S. Pat. No. 6,088,635.

A vehicle crash data recorder is presented by inventor Ferguson of Bellaire, Ohio in U.S. Pat. No. 6,185,490. The apparatus is arranged with a three stage memory to record and retain information. And further it is equipped with a series and parallel connectors to provide instant on-scene access to accident data. It is important to note that Ferguson finds it important to include the possibility of on-site access to the data. Further, that. Ferguson teaches use of a wired connection in the form of a serial or parallel hardwire connector. This teaching of Ferguson is common in many advanced systems configured as vehicle event recorders.

A traffic accident data recorder and traffic accident reproduction system and method is presented as U.S. Pat. No. 6,246,933. A plurality of sensors for registering vehicle operation parameters including at least one vehicle mounted digital video, audio camera is included for sensing storing and updating operational parameters. A rewritable, nonvolatile memory is provided for storing those processed operational parameters and video images and audio signals, which are provided by the microprocessor controller. Data is converted to a computer readable form and read by a computer such that an accident can be reconstructed via data collected.

U.S. Pat. No. 6,298,290 presented by Abe et al, teaches a memory apparatus for vehicle information data. A plurality of sensors including a CCD camera collision center of vehicle speed sensors, steering angle sensor, brake pressure sensor, acceleration sensor, are all coupled to a control unit. Further, the control unit passes information to a flash memory and a RAM memory subject to an encoder. The information collected is passed through a video output terminal. This illustrates another hardwire system and the importance placed by experts in the art on a computer hardware interface. This is partly due to the fact that video systems are typically data intensive and wired systems are necessary as they have bandwidth sufficient for transfers of large amounts of data.

Mazzilli of Bayside, N.Y. teaches in U.S. Pat. No. 6,333,759 a 360° automobile video camera system. A complex mechanical mount provides for a single camera to adjust its viewing angle giving a 360° range for video recording inside and outside of an automotive vehicle.

U.S. Pat. No. 6,389,339 granted to Inventor Just, of Alpharetta, Ga. teaches a vehicle operation monitoring system and method. Operation of a vehicle is monitored with an onboard video camera linked with a radio transceiver. A monitoring service includes a cellular telecommunications network to view a video data received from the transceiver to a home-base computer. These systems are aimed at parental monitoring of adolescent driving. The mobile modem is designed for transmitting live video information into the network as the vehicle travels.

Morgan, Hausman, Chilek, Hubenak, Kappler, Witz, and Wright with their heads together invented an advanced law enforcement and response technology in U.S. Pat. No. 6,411,874 granted Jun. 25, 2002. A central control system affords intuitive and easy control of numerous subsystems associated with a police car or other emergency vehicle. This highly integrated system provides advanced control apparatus which drives a plurality of detector systems including video and audio systems distributed about the vehicle. A primary feature included in this device includes an advanced user interface and display system, which permits high level driver interaction with the system.

Inventor Lambert teaches in U.S. Pat. No. 6,421,080 a "digital surveillance system with pre-event recording". Pre-event recording is important in accident recording systems, because detection of the accident generally happens after the accident has occurred. A first memory is used for temporary storage. Images are stored in the temporary storage continuously until a trigger is activated which indicates an accident has occurred at which time images are transferred to a more permanent memory.

Systems taught by Gary Rayner in U.S. Pat. Nos. 6,389,340; 6,405,112; 6,449,540; and 6,718,239, each directed to cameras for automobiles which capture video images, both of forward-looking and driver views, and store recorded images locally on a mass storage system. An operator, at the end of the vehicle service day, puts a wired connector into a device port and downloads information into a desktop computer system having specialized application software whereby the images and other information can be played-back and analyzed at a highly integrated user display interface.

It is not possible in the systems Rayner teaches for an administrative operator to manipulate or otherwise handle the data captured in the vehicle at an off-site location without human intervention. It is necessary for a download operator to transfer data captured from the recorder unit device to a disconnected computer system. While proprietary 'DriveCam' files can be e-mailed or otherwise transferred through the Internet, those files are in a format with a can only be digested by desktop software running at a remote computer. It is necessary to have the DriveCam desktop application on the remote computer. In order that the files be properly read. In this way, data captured by the vehicles is totally unavailable to some parties having an interest in the data. Namely those parties who do not have access to a computer appropriately arranged with the specific DriveCam application software. A second and major disadvantage is systems presented by Rayner includes necessity that a human operator service the equipment each day in a manual download action.

Remote reporting and manipulation of automobile systems is not entirely new. The following are very important teachings relating to some automobile systems having a wireless communications link component.

Inventors Fan et al, teach inventions of methods and systems for detecting vehicle collision using global positioning system GPS. The disclosure of Jun. 12, 2001 resulted in granted patent having U.S. Pat. No. 6,459,988. A GPS receiver is combined with wireless technology to automatically report accident and third parties remotely located. A system uses the GPS signals to determine when an acceleration value exceeds the preset threshold which is meant to be indicative of an accident having occurred.

Of particular interest include inventions presented by inventors Nagda et al., in the document numbered U.S. Pat. No. 6,862,524 entitled using location data to determine trafficking route information. In this system for determining and disseminating traffic information or route information, traffic condition information is collected from mobile units that provide their location or position information. Further route information may be utilized to determine whether a mobile unit is allowed or prohibited from traveling along a certain route.

A common assignee, @Road Inc., owns the preceding two patents in addition to the following: U.S. Pat. Nos. 6,529,159; 6,552,682; 6,594,576; 6,664,922; 6,795,017; 6,832,140; 6,867,733; 6,882,313; and 6,922,566. As such, @Road Inc., must be considered a major innovator in position technologies arts as they relate to mobile vehicles and remote server computers.

General Motors Corp. teaches in U.S. Pat. No. 6,728,612, an automated telematics test system and method. The invention provides a method and system testing a telematics system in a mobile vehicle a test command from a test center to a call center is based on a test script. The mobile vehicle is continuously in contact by way of cellular communication networks with a remotely located host computer.

Inventor Earl Diem and Delphi Technologies Inc., had granted to them on Sep. 20, 2005, U.S. Pat. No. 6,947,817. The nonintrusive diagnostic tool for sensing oxygen sensor operation include a scheme or an oxygen analyzer deployed in a mobile vehicle communicates by way of an access point to a remotely located server. A diagnostic heuristic is used to analyze the data and confirm proper operation of the sensor. Analysis may be performed by a mainframe computer quickly note from the actual oxygen sensor.

Similar patents including special relationships between mobile vehicles and remote host computers include those presented by various inventors in U.S. Pat. Nos. 6,735,503; 6,739,078; 6,760,757; 6,810,362; 6,832,141; and 6,850,823.

Another special group of inventions owned by Reynolds and Reynolds Holding Inc., is taught first by Lightner et al, in U.S. Pat. No. 6,928,348 issued Aug. 9, 2005. In these inventions, Internet based emission tests are performed on vehicles having special wireless couplings to computer networks. Data may be further transferred to entities of particular interest including the EPA or California Air Resources Board, for example, or particular insurance companies and other organizations concerned with vehicle emissions and environment.

Other patents held by Reynolds and Reynolds Holding Inc., include those relating to reporting of automobile performance parameters to remote servers via wireless links. Specifically, an onboard data bus OBD system is coupled to a microprocessor, by way of a standard electrical connector. The microprocessor periodically receives data and transmits it into the wireless communications system This information is more fully described in U.S. patent granted Oct. 21, 2003 numbered U.S. Pat. No. 6,636,790. Inventors Lightner et al, present method and apparatus for remotely characterizing the vehicle performance. Data at the onboard data by his periodically received by a microprocessor and passed into a local transmitter. The invention specifically calls out transmission of data on a predetermined time interval. Thus these inventions do not anticipate nor include processing and analysis steps which result in data being passed at time other than expiration of the predetermined time period.

Reynolds and Reynolds Holding Inc., further describes systems where motor vehicles are coupled by wireless communications links to remote host servers in U.S. Pat. No. 6,732,031.

While systems and inventions of the arts are designed to achieve particular goals and objectives, some of those being no less than remarkable, these inventions have limitations which prevent their use in new ways now possible. Inventions of the art are not used and cannot be used to realize the advantages and objectives of the inventions taught here following.

SUMMARY OF THESE INVENTIONS

Comes now, James Plante with inventions of vehicle event recorder systems. having integrated cellular wireless communications links.

Vehicle event recorders including those provided with imaging means, are arranged to monitor vehicle use and to collect images of scenes occurring about the vehicle's environments among other vehicle performance and use data. Further, these systems are arranged to collect data associated with a particular moment in time, or an "event" and to preserve that data for post event review.

In accordance with some preferred versions of these inventions, a detailed or 'complete' dataset is parsed, compressed and otherwise reduced into a data subset of limited size. Thus, an "abbreviated" dataset is a data subset which may be more readily transmitted on limited bandwidth systems. While an abbreviated dataset is passed into the network in near real time, a complete dataset may be preserved locally for transmission at a later time when a higher bandwidth link becomes available.

As such, vehicle event recorder systems of these inventions are deployed in conjunction with wireless mobile telephone type communications networks. A video camera, vehicle systems transducers, and other measurement systems associated with vehicle use all operate to collect data during the service use of a vehicle. On the occurrence of an "event", for example, a traffic accident, data is captured and preserved in a special onboard memory. Further, a parsing module is provided to extract the most important information which may be represented in a dataset of reduced size. Accordingly, these systems may be characterized in summary as including vehicle event recorders with a video camera, microprocessor, memory, parsing module, and a mobile wireless communications transceiver; further, those vehicle event recorders in communication with a mobile wireless base station, gateway, Internet and remote application specific server.

Objectives of these Inventions

It is a primary object of these inventions to provide new vehicle fleet management tools.

It is an object of these inventions to provide vehicle fleet management systems having a video component.

It is a further object to provide vehicle fleet management systems arranged with high performance mobile network connectivity and function.

It is an object of these inventions to provide video based vehicle fleet management systems in conjunction with ubiquitous, always-on, mobile wireless networks.

An object of these inventions includes provision of video based vehicle fleet management systems in conjunction with cellular type wireless networks.

A better understanding can be had with reference to detailed description of preferred embodiments and with reference to appended drawings. Embodiments presented are particular ways to realize these inventions and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

BRIEF DESCRIPTION OF THE DRAWING FIGURES

These and other features, aspects, and advantages of the present inventions will become better understood with regard to the following description, appended claims and drawings where:

Figure 3:
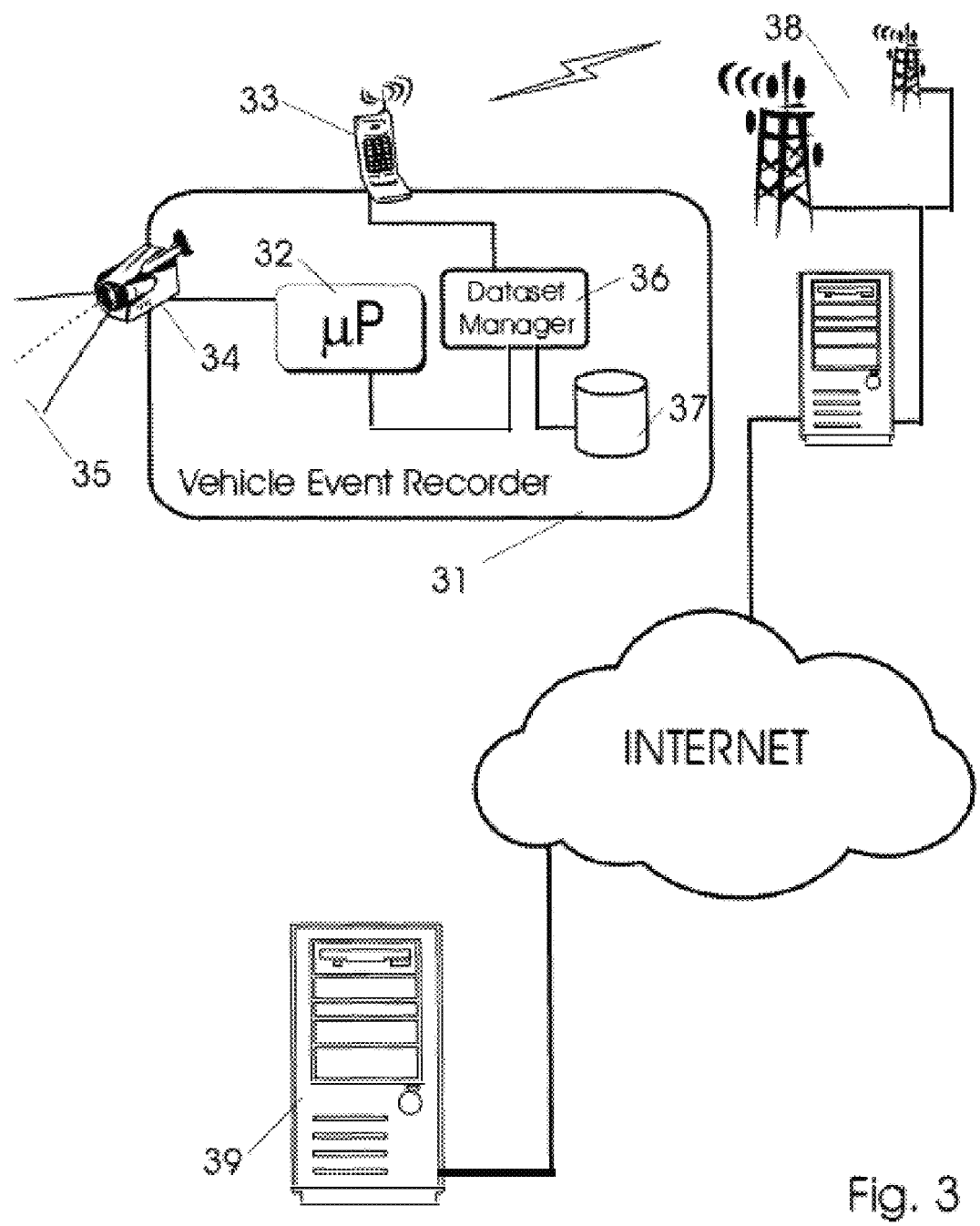
Figure 4:
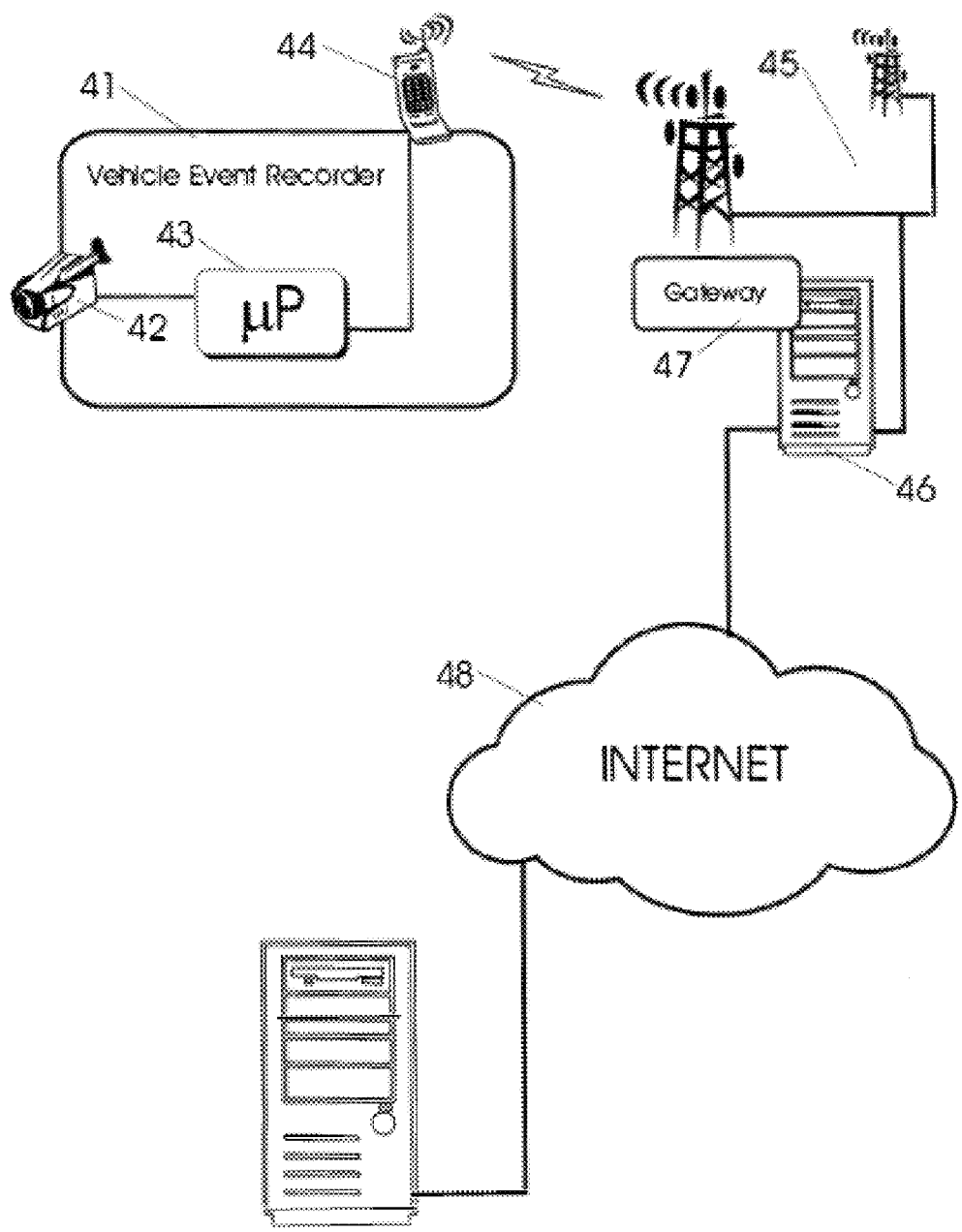

FIG. 3 presents in block diagram, versions of these systems along with special interfaces between some primary system elements;

FIG. 4 diagrams some important secondary elements; and finally

Figure 5:
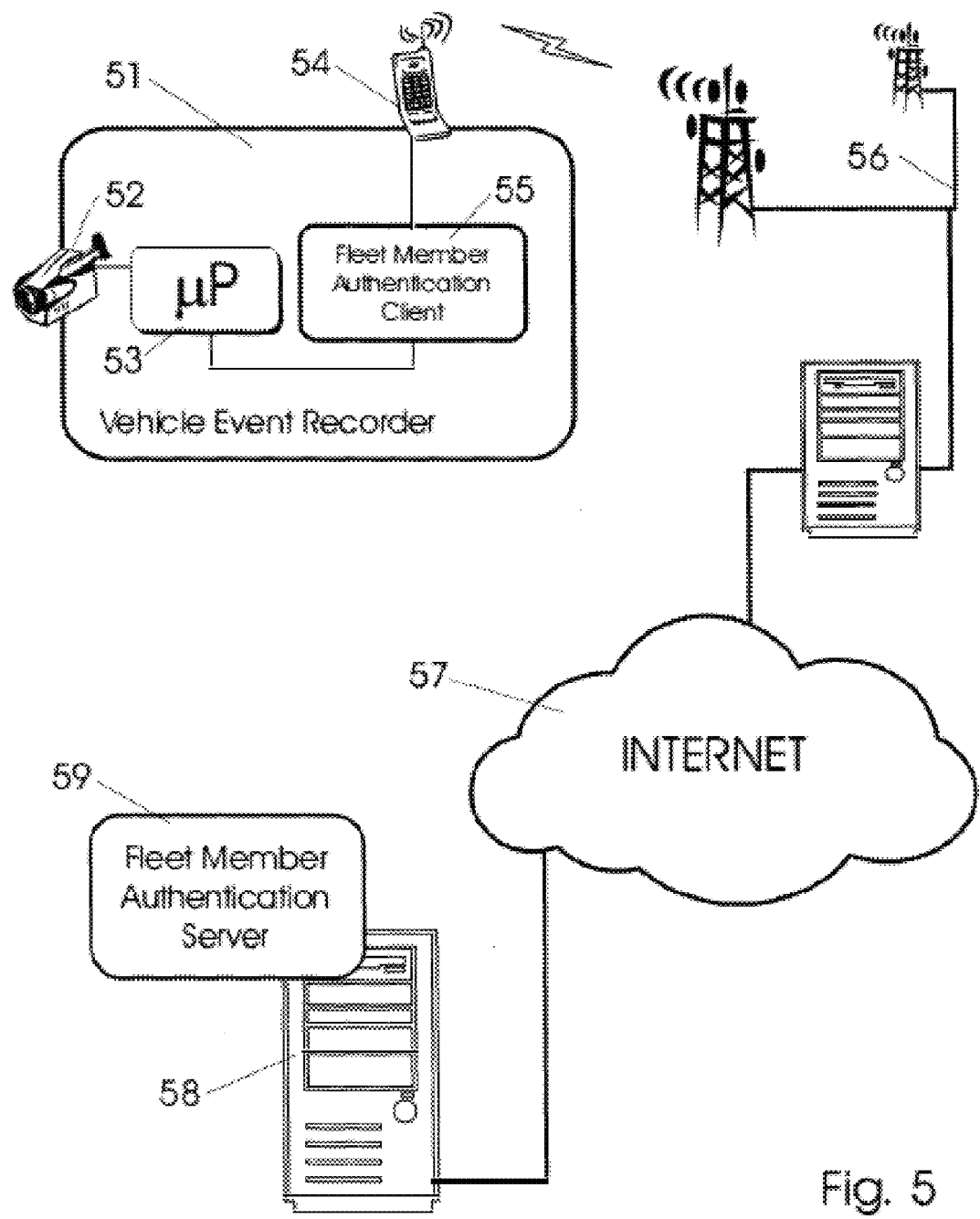

FIG. 5 illustrates a block schematic with specially arranged authentication clients/servers.

GLOSSARY OF SPECIAL TERMS

Throughout this disclosure, reference is made to some terms which may or may not be exactly defined in popular dictionaries as they are defined here. To provide a more precise disclosure, the following terms are presented with a view to clarity so that the true breadth and scope may be more readily appreciated. Although every attempt is made to be precise and thorough, it is a necessary condition that not all meanings associated with each term can be completely set forth. Accordingly, each term is intended to also include its common meaning which may be derived from general usage within the pertinent arts or by dictionary meaning. Where the presented definition is in conflict with a dictionary or arts definition, one must consider context of use and provide liberal discretion to arrive at an intended meaning. One will be well advised to error on the side of attaching broader meanings to terms used in order to fully appreciate the entire depth of the teaching and to understand all intended variations.

Cellular Wireless Communications Networks

The term 'cellular wireless communications networks' is intended to include those wireless networks having large coverage areas comprised of cells which further include 'handoff' mechanisms for nodes passing from one cell to another whereby a continuous connection is maintained.

Gateway

A 'gateway' is a coupling system used to interface together two independent systems whereby a protocol used on a first system is translated into a protocol used on a second system.

Managed Loop Memory

A 'managed loop memory' is a memory system arranged to preserve in detail data captured during a period immediately past with respect to any instant but to overwrite that data with newer data when that data has sufficiently aged in accordance with a predefined expiration definition.

Vehicle Environments

The environment in and about a vehicle includes those spaces interior or exterior with respect to the car body. That is to say, traffic ahead of, behind, towards the sides of, and inside the driver compartment are all included as vehicle environments.

Communications Port

Includes for example: cellular transceiver; WiFi; Network Interface card; serial port such as RS-232; among others.

PREFERRED EMBODIMENTS OF THESE INVENTIONS

In accordance with each of preferred embodiments of these inventions, vehicle event recorders with integrated cellular wireless communications systems are provided. It will be appreciated that each of embodiments described include an apparatus and that the apparatus of one preferred embodiment may be different than the apparatus of another embodiment presented in an alternative example.

Combinations of vehicle event recorders coupled with mobile telephone communications networks, the Internet, and special application-specific servers and databases form the basis of best modes of these inventions. In particular, a vehicle event recorder is comprised of a video camera, a mobile wireless type radio transceiver and microprocessor. The video camera is arranged to have a field-of-view including environments about a vehicle in which the recorder is installed—generally a forward-looking viewpoint and sometimes a vehicle driver compartment viewpoint. The video camera runs continuously while a vehicle is in use capturing images of scenes occurring about the vehicle. In the event of a traffic accident or some other physical anomaly, a video series including frames from before and after the accident are captured by way of a special memory management system. A microprocessor is electronically coupled to the mobile telephone transceiver whereby it can transmit/receive data to/from further into a network where it may couple with a remote server running application specific software. The wireless transceiver operates to convert electronic signals from the microprocessor into electromagnetic signals for free space transmission. These electromagnetic signals are received at either of the base stations belonging to the spatially distributed cells and converted back into electronic signals. Those electronic signals may be further transmitted via packet networks to remote servers for additional analysis and processing.

While vehicle event recorder arrangements have been suggested in conjunction with wireless communications networks, namely in U.S. patent application Ser. No. 11/299,028, that disclosure is hereby incorporated herein by explicit reference, those systems are limited with respect to the space in which download actions can be executed. In those systems, a vehicle performs its assigned service and thereafter returns to a download location; i.e. the vehicle enters a specially arranged space such that the vehicle is near to a WiFi transceiver base station or 'access point'. Such proximity condition is detected, and in response to detection of that condition a data transfer action causes data to be passed to the remote server. These systems require a vehicle to return to an approved download space in order that an authorized network connection be made. It is generally not possible to transfer data while the vehicle is active in the duty of its assignment.

In the present inventions, it is a primary feature that a vehicle is in continuous contact with the remote server while it is being used over extremely large regions. This is possible because a vehicle event recorder is coupled to a remoter server via links arranged in wireless cellular communications networks. These are quite distinct from previous wireless networks as they are formed of a great plurality of cooperating base stations well distributed to provide continuous coverage over extended area. A plurality of transmitters each spatially removed from another, each having a communication range which forms a partial overlap with the communication range of at least one other defines a coverage space, the extent of said coverage space being at least a few tens of cubic miles. Further distinction with regard to WiFi wireless systems which may include a plurality of transmitters all coupled to form a single network, cellular networks, more specifically those arranged as mobile telephone systems, include special handoff mechanisms whereby a mobile transceiver which passes from one cell to another cell maintains a seemingly continuous connection. In this way, the coverage space in which a connection may be maintained to extend over many hundreds of square miles.

To further improve range, wireless systems arranged as cellular networks use electromagnetic radiation of particular frequency and specialized antennae suitable for long-range transmissions. These electromagnetic signals are arranged, both in frequency and protocol, to cooperate with common mobile telecommunications networks. For example, these signals may be arranged in the frequency band between about 750 MHz and 2000 MHz. Some common cellular networks are build about the frequency bands having a center frequency at 900 MHz or 1800 MHz. For example, in a GSM frequency band is divided into 124 carrier frequencies, or subbands, spaced 200 kHz apart in a frequency division multiple access FDMA scheme. Each subband may be further divided into a time-sharing scheme, or TDMA time division multiple access system.

As the particular nature of vehicle event recorder systems and their use in fleet vehicles demands network connections which may be maintained continuously over very large ranges, the combination of a vehicle event recorder head with a cellular type wireless network should be viewed as particularly beneficial and cooperative in a synergistic way. The combination of vehicle event recorders with wireless cellular networks provides fantastic benefit. Among which includes continuing communication between a remote server and a vehicle during a service today. However, this combination is also accompanied by some disadvantage. The bandwidth of wireless cellular networks is not sufficiently adequate whereby high-resolution real-time video may be uploaded from an in-vehicle system. Accordingly, it is sometimes necessary to provide special means for forming datasets of reduced size which may be more readily transmitted over limited bandwidth networks such as common wireless cellular networks.

In a first of such systems, a vehicle event recorder head includes a local memory which is well managed in view of an overwrite scheme which discards unnecessary data of low value while preserving high value data for transmission to the remote server. In other systems, a complete dataset may be abbreviated with the abbreviated portion subject to instant transmission and the complete dataset subject to non real-time transmission, but rather subject to a delayed transmission at times when network resources become more available. Thus, a high priority dataset and lower priority dataset may be formed in conjunction with a single event. The high priority dataset is of limited or reduced size and subject to instant transmission, the low priority dataset may be considerably larger but more permissive with respect to transmission delay.

Figure 1:
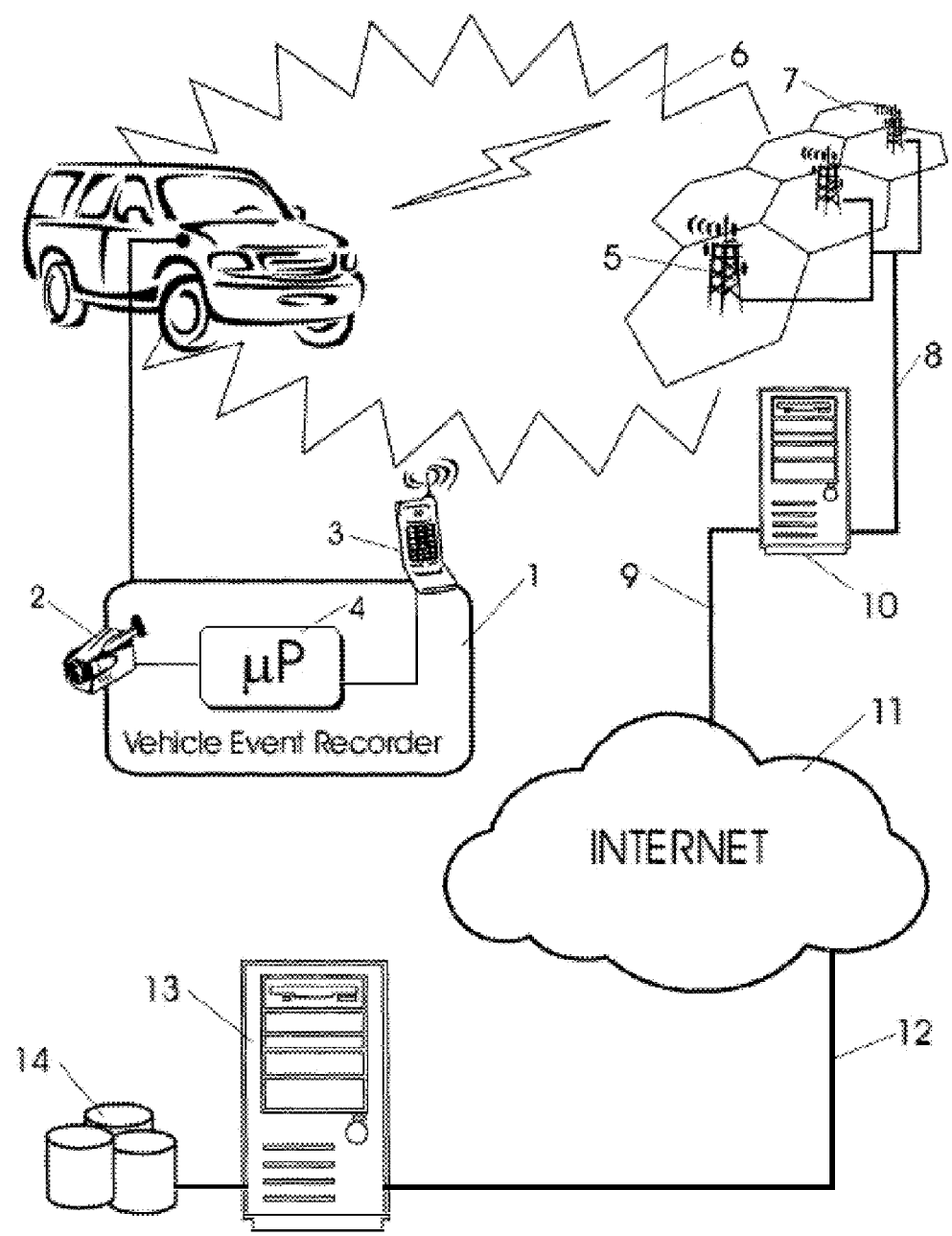
FIG. 1 is a schematic diagram of vehicle event recorder systems including a vehicle event recorder in relation with a compound network.

These concepts and others are more readily understood in view of the following discussion with reference to numerals which is directed to FIGS. 1 through 5. Particularly, the diagram of FIG. 1 illustrates vehicle event recorder systems in a schematic presentation. A vehicle event recorder head 1, includes as primary elements a video camera 2, a wireless communications transceiver 3, and a computer microprocessor 4. These elements arranged in a common housing may be mounted conveniently within a vehicle for example, on the interior, near the dashboard behind the windshield. The combination including: a video camera; processor; mobile wireless communications link, prepared as a single unit suitable for integration with the vehicle is sometimes and herein called a 'vehicle event recorder head' or the 'head unit'. So long as a vehicle remains within the coverage space of the cellular network, images collected by the video camera may be processed by the microprocessor and transmitted through the cellular network to remote servers. A distribution of various cellular base stations 5 forms a coverage space 6 which may extend many tens of cubic miles. A plurality of these base stations operate in conjunction with one another by way of 'handoff' mechanisms to form the 'cellular' arrangement 7. A vehicle passing from one cell to another cell seamlessly transfers communication from a first a base station to a second base station without ever having lost connection 8 to the network. In this way, data from a vehicle event recorder may be continuously transferred into the network even at times when a vehicle passes from a first cell to another. Thus very large continuous coverage areas are provided such that a vehicle event recorder mounted in a vehicle is continuously in contact with a remote server throughout the service day. Such advantage cannot be available in wired or fixed wireless systems having in comparison—severely limited range.

It is important to point out that an arrangement of these architectures includes a protocol translator between those communications protocols of wired networks and those communications protocols preferred on mobile wireless networks. Thus these vehicle event recorder systems may be considered as including a compound communications network comprised of a wireless side 8 and a wired side 9 with a protocol translator or 'gateway' 10 there between. Further these compound networks may also include the Internet 11 which may be connected 12 to remote server 13, and still further to a mass storage database 14.

Experts in the field will surely appreciate that a high-resolution video camera generates far too much data than which can be transmitted in real-time over a common wireless mobile cellular communications network. It is for this reason that in some versions a special memory system be adopted whereby high-resolution video can be collected and pre-processed before transmission over the wireless link. In a first scheme, a managed loop memory is arranged to receive video frames while simultaneously discarding older frames in accordance with a strategy which preserves most valuable data. Since only 'most valuable' data is transmitted, a limited communications link is not totally consumed by an unprocessed video stream.

Figure 2:
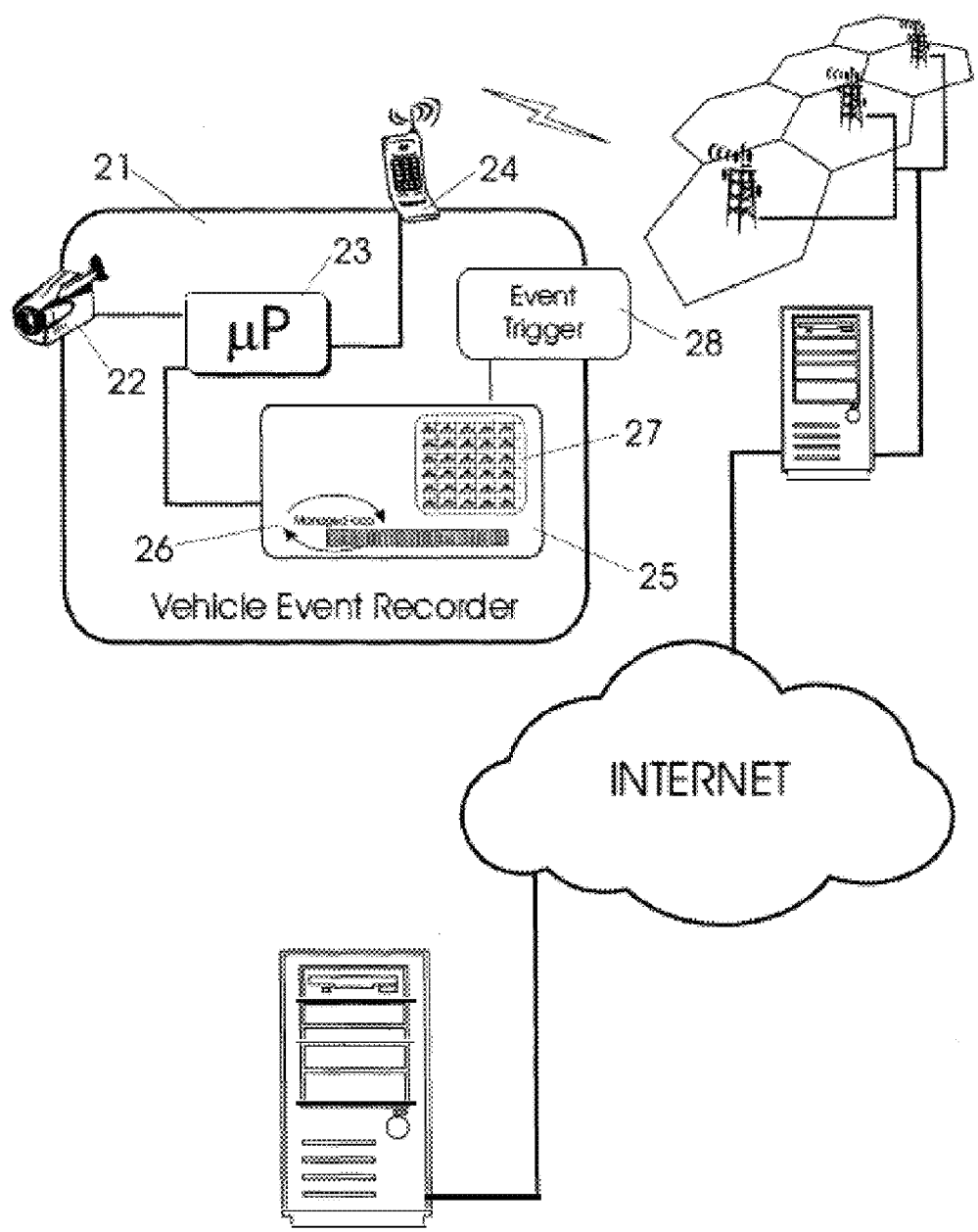
FIG. 2 is a diagram including special detail relating to memory management.

In FIG. 2 it can be it further appreciated that a vehicle event recorder head 21 is comprised of a video camera 22, a microprocessor 23, a wireless mobile communications transceiver 24, an advanced two-stage memory 25 comprising a managed-loop memory 26, and a flash-type memory buffer 27. Although video is continuously captured by the video camera and transferred to the managed loop memory portion, only on a toggle action of the event trigger 28 is data transferred from the loop to the flash memory buffer. The data set which is transferred to the flash memory buffer, may be considerably reduced in size when compared to an unprocessed continuous video stream. One will gain a further appreciation of these memory management arrangements, which are fully disclosed in detail in U.S. patent application filed Dec. 7, 2005 entitled: "Memory Management in Event Recording Systems" which is hereby incorporated into this disclosure by explicit reference.

While memory management techniques described above are considered preferred best modes, is explicitly noted and anticipated herein that many other schemes might be usefully deployed to reduce a continuous data stream collected by a video camera to an abbreviated dataset more suitable for transmission over limited bandwidth communications links. Accordingly, we consider a system architecture depicted in FIG. 3. A vehicle event recorder head 31 is comprised of the microprocessor 32, communications transceiver 33, video camera 34 having field of view 35, dataset manager 36, and mass data storage buffer 37. The dataset manager is arranged to receive video data and to process received data to produce an abbreviated dataset which has a reduced amount of data in comparison to a data heavy continuous video stream. Once a dataset manager produces an abbreviated dataset in the vehicle event recorder head, that abbreviated dataset may be transmitted by mobile communications transceiver into the cellular network 38, and further through a wired network and to remote server 39.

FIG. 4 illustrates another important element of these systems. Due to the specific physical nature of cellular communications networks, certain transmission protocols are required. However, wired networks have different characteristics, and thus different transmission protocols are used with those networks. When a compound network is formed of a wireless portion and a wired portion, a system must be put in place to translate from one protocol to another and perform the reverse operation for data traffic going in an opposing direction. This protocol translator is sometimes and herein called a 'gateway'. FIG. 4 illustrates a system having a gateway protocol translator between a wired portion and a wireless portion of a compound communications network. A vehicle event recorder head 41, includes video camera 42, microprocessor 43, and cellular transceiver 44. The cellular transceiver 44 may transmit and receive data messages in accordance with protocols used with wireless cellular networks such as W-CDMA, EvDO, GPRS, EDGE, PCS, CDMA, and GSM, among others.

Wireless cellular network 45 may include a base station 46. The base station may have special gateway module 47 arranged to translate protocols associated wireless networks into protocols used more commonly with wired networks such as the Internet 48. High speed wired type networks most commonly deploy transmission protocols such as those including: TCP/IP, UDP, XML, HTML data exchange formats among others. In this way, a vehicle event recorder system of these inventions includes a vehicle event recorder head in communication with a compound network including a wireless portion and a wired portion coupled together by way of a protocol gateway. In preferred versions, the wireless portion of these networks is arranged as a cellular mobile wireless network commonly used with mobile telephones. In preferred versions, the wired portion of the network includes the Internet which supports remote location and widely available access to a system server.

Finally, FIG. 5 illustrates yet another important feature of these systems. As these systems are primarily directed to vehicle fleet management strategy, fleet member authentication client and server modules are to be included as part of a vehicle event recorder head and remote server respectively. A fleet member authentication client is a module which provides handshaking and identification functionality such that a particular vehicle event recorder associated with a particular vehicle, or vehicle and user/driver, to present itself as such to the fleet member authentication server module. In this way, a single remote server may be in communication with a plurality of vehicles and groups of vehicles all associated with a particular vehicle fleet. The remote server can thereafter manage event data received from various vehicles and sort it as part of the particular fleet and further manage access to the data with regard to particular fleet administrator. In the figure, vehicle event recorder head 51, includes video camera 52, microprocessor 53, and wireless transceiver 54. In addition vehicle event recorder head is integrated with a fleet member authentication client module 55. When in communication with a remote server, the authentication module presents an identity scheme which is transmitted by cellular network 56 and further by wired network 57. The remote server 58 is integrated with a fleet member authentication server module 59. Calls from particular vehicle event recorders are received by the server and processed in accordance with their association with a specific fleet known to the server.

While in general a vehicle event recorder head is arranged to automatically connect wirelessly to the network in response to an event trigger, other actions may be arranged to initiate a data transfers. One such action includes that which occurs remote from the vehicle event recorder head. A systems administrator might initiate a request for information from a particular vehicle while operating in the field. The request is transmitted from the remote server, and hits the vehicle event recorder head to trigger a data transfer in agreement with the request. The request may be for a 'present instant' dataset which is generated at a vehicle event recorder head in real-time. Alternatively the request may be for a dataset associated with a prior instant; that dataset having been stored in a local memory. In either case, these systems are meant to include data-transfer actions and which are initiated by an administrator operating from a remote server station or other remote location.

In some versions of these inventions, it is necessary throttle data transmission in accordance with network congestion considerations. When a wireless cellular telephone network is very busy, the system resources should be allocated to those applications which require real-time data exchange. For example, a voice conversation is a real-time application that requires receipt of data without delay. However in most instances, data collected by a vehicle event recorder is not subject to compromise when it is received at a remote server with some reasonable delay. Accordingly, these systems are arranged such that the vehicle event recorder head is responsive in its data transmission activity as directed from an indicator provided by the network, the indicator being indicative of network capacity or network congestion. This function, among others may be taken up at a dataset manager.

While an 'Internet Server' is a general purpose server which can provide hosting and HTML response services to any requesting agent, the servers described here are not general purpose Internet servers. Rather, these servers include application-specific code. This code is particularly arranged with a view to support of vehicle event recorder systems. That is to say, servers are predefined in their function. Such that they are responsive to calls made by cooperating vehicle event recorder heads which have a priori knowledge of the existence of the server and the functions enabled therein. Thus proprietary calls and responses may be exchanged between an authorized vehicle event recorder head and a remote server suitable for receiving such calls from those authorized vehicle event recorders.

By way of example one such important function includes authentication services. In these systems, it is important that only authorized vehicle event recorder units be allowed to communicate with specific servers arranged to receive their communications. Thus both servers and vehicle event recorders are arranged with authentication modules. An authentication client is part of a vehicle event recorder unit; and an authentication server is part of the remote server suite of functionality. Thus, special relationships are formed between vehicle event recorders and associated remote servers. In this way, special fleet administration including fleet messaging may be established. Vehicle event recorders may operate in groups of cooperating units, these groups having further associations with entities such as business divisions or other logical groupings.

One will now fully appreciate how highly mobile vehicle event recorders are coupled to remote servers by way of wireless cellular communications networks to provide continuous links over greatly extended communications spaces. Although the present inventions have been described in considerable detail with clear and concise language and with reference to certain preferred versions thereof including best modes anticipated by the inventors, other versions are possible. Therefore, the spirit and scope of the invention should not be limited by the description of the preferred versions contained therein, but rather by the claims appended hereto.

It is claimed:
1. A vehicle event recorder system comprising:
a video camera configured to capture image data, wherein the video camera has a field of view arranged to include an environment in and/or around a vehicle;
a communications transceiver configured to transmit information via a communication network to a server computer;
an electronic memory configured to electronically store information; and
a microprocessor configured to:
effectuate storage of captured image data in the electronic memory, responsive to physical anomaly event triggers, create detailed complete datasets that correspond to individual physical anomaly event triggers, wherein the detailed complete datasets include image data captured by the video camera;
create abbreviated datasets by parsing the detailed complete datasets such that the abbreviated datasets include less bytes of data than the corresponding detailed complete datasets;
effectuate storage of the abbreviated datasets in the electronic memory, and
facilitate transmission of an individual one of the detailed complete datasets and the abbreviated datasets via the communications transceiver based on an amount of available bandwidth in the communication network,
wherein the microprocessor is configured to facilitate transmission of an individual one of the abbreviated datasets responsive to the amount of available bandwidth being sufficient to permit transmission of the abbreviated datasets in real-time or near real-time, and
wherein the microprocessor is configured to facilitate transmission of an individual one of the detailed complete datasets responsive to the amount of available bandwidth being sufficient to permit transmission of the detailed complete datasets.

2. The vehicle event recorder system of claim 1, wherein the microprocessor is further configured to determine the amount of available bandwidth in the communication network for use by the communications transceiver, wherein the amount is determined prior to transmission of one or both of the abbreviated datasets and the detailed complete datasets.

3. The event recorder system of claim 1, wherein the captured image data includes video images associated with a prescribed moment in time, wherein the prescribed moment corresponds to a given physical anomaly event trigger, and wherein the captured image data includes video images captured prior to and after the prescribed moment in time.

4. The vehicle event recorder system of claim 3, wherein the given physical anomaly event trigger corresponds to a collision.

5. The vehicle event recorder system of claim 1, wherein the detailed complete datasets include a first detailed complete dataset and a second detailed complete dataset, wherein the first detailed complete dataset corresponds to a first physical anomaly event trigger, wherein the second detailed complete dataset corresponds to a second physical anomaly event trigger, wherein the first detailed complete dataset includes more bytes of data than the second detailed complete dataset wherein the abbreviated datasets include a first abbreviated dataset and a second abbreviated dataset, wherein the first abbreviated dataset corresponds to the first detailed complete dataset, and wherein the second abbreviated dataset corresponds to the second detailed complete dataset.

6. The vehicle event recorder system of claim 5, wherein the microprocessor is configured to facilitate transmission of the first detailed complete datasets responsive to the amount of available bandwidth being sufficient to permit transmission of the first detailed complete dataset, and wherein the microprocessor is configured to facilitate transmission of the second detailed complete datasets responsive to the amount of available bandwidth being sufficient to permit transmission of the second detailed complete dataset.

7. The vehicle event recorder system of claim 1, further comprising a vehicle system transducer configured to collect data during use of the vehicle, wherein detection of the physical anomaly event triggers is based on the data collected by the vehicle system transducer.

8. The vehicle event recorder system of claim 1, wherein the electronic memory includes managed loop memory and buffer memory, wherein the microprocessor is configured to effectuate storage of captured image data in the managed loop memory, and wherein the microprocessor is further configured to transfer, responsive to the physical anomaly event triggers, the captured image data from the managed loop memory to the buffer memory.

9. The vehicle event recorder system of claim 8, wherein the microprocessor is configured to effectuate storage of the abbreviated datasets in the buffer memory, and wherein the communications transceiver is configured to transmit information from the buffer memory via the communication network to the server computer.

10. The vehicle event recorder system of claim 1, wherein the microprocessor is configured to create the abbreviated datasets through compression of the detailed complete datasets.

11. The vehicle event recorder system of claim 1, wherein transmission of the individual one of the abbreviated datasets via the communications transceiver is performed wirelessly.

12. The vehicle event recorder system of claim 1, further comprising the server computer configured to receive transmission from the communications transceiver.

13. The vehicle event recorder system of claim 12, further comprising an authentication client configured to provide authentication services, wherein the server computer includes an authentication component and vehicle event recorder application specific software, wherein the authentication component authenticates transmissions of one or both of the abbreviated datasets and the detailed complete datasets using the authentication client.

* * * * *